United States Patent
Fife

(10) Patent No.: US 6,616,728 B2
(45) Date of Patent: *Sep. 9, 2003

(54) NITRIDED NIOBIUM POWDERS AND NIOBIUM ELECTROLYTIC CAPACITORS

(75) Inventor: James A. Fife, Reading, PA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/006,030

(22) Filed: Dec. 7, 2001

(65) Prior Publication Data

US 2002/0069724 A1 Jun. 13, 2002

Related U.S. Application Data

(60) Continuation of application No. 09/522,318, filed on Mar. 9, 2000, now Pat. No. 6,338,816, which is a division of application No. 09/071,537, filed on May 4, 1998, now Pat. No. 6,051,044.

(51) Int. Cl.$^7$ ................................................. B22F 1/00
(52) U.S. Cl. ................................. 75/255; 361/301.1
(58) Field of Search ......................... 75/255; 361/301.1

(56) References Cited

U.S. PATENT DOCUMENTS

| | | | |
|---|---|---|---|
| 3,427,132 A | 2/1969 | Goon | |
| 3,496,076 A | 2/1970 | Cheseldine | 204/56 |
| 3,630,718 A | 12/1971 | Neuenschwander | 75/0.5 |
| 3,635,693 A | 1/1972 | Friedrich et al. | 75/0.5 BB |
| 3,647,420 A | 3/1972 | Restelli | 75/84 |
| 3,825,802 A | 7/1974 | Kumagai et al. | |
| 3,847,658 A | 11/1974 | Kumagai | |
| 4,009,007 A | 2/1977 | Fry | 29/182.5 |
| 4,017,302 A | 4/1977 | Bates et al. | |
| 4,084,965 A | 4/1978 | Fry | 75/230 |
| 4,141,720 A | 2/1979 | Vartanian | 75/0.5 BB |
| 4,231,790 A | 11/1980 | Hähn et al. | 75/0.5 BB |
| 4,347,084 A | 8/1982 | Hähn et al. | 75/245 |
| 4,441,927 A | 4/1984 | Getz et al. | 75/229 |
| 4,483,819 A | 11/1984 | Albrecht et al. | 419/2 |
| 4,512,805 A | 4/1985 | Albrecht et al. | 75/244 |
| 4,537,641 A | 8/1985 | Albrecht et al. | 148/11.5 |
| 4,544,403 A | 10/1985 | Schiele et al. | 75/0.5 |
| 4,548,672 A | 10/1985 | Albrecht et al. | 156/646 |
| 4,569,693 A | 2/1986 | Albrecht et al. | 75/252 |
| 4,684,399 A | 8/1987 | Bergman et al. | 75/0.5 BB |
| 4,722,756 A | 2/1988 | Hard | 148/126 |
| 4,740,238 A | 4/1988 | Schiele | 75/0.5 BB |
| 4,940,490 A | 7/1990 | Fife et al. | 75/229 |
| 4,954,169 A | 9/1990 | Behrens | 75/228 |
| 5,211,741 A | 5/1993 | Fife | 7/255 |
| 5,234,491 A | 8/1993 | Chang | 75/622 |
| 5,242,481 A | 9/1993 | Kumar | 75/364 |
| 5,245,514 A | 9/1993 | Fife et al. | 361/529 |
| 5,261,942 A | 11/1993 | Fife et al. | 75/342 |
| 5,284,531 A | 2/1994 | Fife | 148/513 |
| 5,412,533 A | 5/1995 | Murayama et al. | 361/528 |
| 5,448,447 A | 9/1995 | Chang | 361/529 |
| 5,580,367 A | 12/1996 | Fife | 75/255 |
| 6,051,044 A | 4/2000 | Fife | 75/229 |
| 6,165,623 A | 12/2000 | Fife et al. | 428/472 |
| 2001/0024351 A1 | 9/2001 | Naito | |

FOREIGN PATENT DOCUMENTS

| | | | |
|---|---|---|---|
| CN | 87 1 07675 A | 5/1988 | |
| CN | 1079333 A | 12/1993 | |
| EP | 0 953 847 A1 | 11/1999 | |
| GB | 1123015 | 8/1965 | |
| JP | 80027601 B | 7/1980 | |
| JP | 58154221 A | 9/1983 | |
| JP | 64-013714 | 1/1989 | H01G/9/04 |
| JP | 64-013715 | 1/1989 | H01G/9/05 |
| JP | 64-019709 | 1/1989 | H01G/9/24 |
| JP | 64-049213 | 2/1989 | H01G/9/24 |
| JP | 01-124214 | 5/1989 | H01G/9/10 |
| JP | 01-205412 | 8/1989 | H01G/9/02 |
| JP | 01-241110 | 9/1989 | H01G/9/00 |
| JP | 01-241813 | 9/1989 | H01G/9/12 |
| JP | 01-319921 | 12/1989 | H01G/9/00 |
| JP | 02-123724 | 5/1990 | H01G/9/05 |
| JP | 02-298013 | 12/1990 | H01G/9/04 |
| JP | 04-271106 | 9/1992 | H01G/4/10 |
| JP | 05-129160 | 5/1993 | H01G/9/02 |
| JP | 05-335187 | 12/1993 | H01G/9/04 |
| JP | 06-168851 | 6/1994 | H01G/9/02 |
| JP | 07-049277 | 2/1995 | G01L/9/12 |
| JP | 07-153650 | 6/1995 | H01G/9/00 |
| JP | 07-220982 | 8/1995 | H01G/9/00 |
| JP | 07-230937 | 8/1995 | H01G/9/052 |
| JP | 09-260603 | 10/1997 | H01L/27/108 |
| JP | 10-135080 | 5/1998 | H01G/9/032 |
| JP | 10-242004 | 9/1998 | H01G/9/052 |
| JP | 11-312628 | 11/1999 | H01G/9/04 |
| JP | 11-329902 | 11/1999 | H01G/9/052 |
| JP | 2000-068157 | 3/2000 | H01G/9/04 |
| JP | 2000-188241 | 7/2000 | H01G/9/04 |
| JP | 2000-188243 | 7/2000 | H01G/9/052 |
| JP | 2000-269091 | 9/2000 | H01G/9/052 |
| JP | 2001-135549 | 5/2001 | H01G/9/028 |
| JP | 2001-155963 | 6/2001 | H01G/9/012 |
| JP | 2001-172701 | 6/2001 | B22F/1/00 |
| RU | 1057995 A | 11/1983 | |
| RU | 1556420 A3 | 2/1994 | |

OTHER PUBLICATIONS

Peabody, "Investigation of Columbium as an Electrolytic Capacitor Anode, Part II," *U.S. Army Signal Research and Development Laboratory, DK Task Nr. 3A99–15–003–04*, pp. 1–11 (No date available).

Palatnik, "Heat Field Stability and Crystallization Peculiarities of Amorphous $Nb_2O_5$, Films" *Fizika I Khimiya Obrabotki Materialov*, 5:87–94 (Feb. 7, 1980).

(List continued on next page.)

*Primary Examiner*—Ngoclan Mai

(57) ABSTRACT

A nitrogen containing niobium powder is disclosed as well as electrolytic capacitors formed from the niobium powders. Methods to reduce DC leakage in a niobium anode are also disclosed.

42 Claims, 21 Drawing Sheets

OTHER PUBLICATIONS

Eckert, "Niobium Compounds and Alloys," *Int. J. Refractory Metals and Hard Materials*, 12:335–340 (1993–1994).

Bord et al., "Quality of Niobium Oxide Semiconductor Capacitors as a Function of Chemical Composition of the Niobium Powder," No. 1(46):11–15 (1982).

Schwartz et al., "Niobium Solid Electrolytic Capacitors," *J. Electrochemical Society*, 108(8):750–757 (1961).

Al–Kharafi et al., "Phosphoric Acid Passivated Niobium and Tantalum EIS–Comparative Study," *Electrochimica Acta*, 40(16):2623–2626 (1995).

Jackson et al., "The Use of Niobium as an Anode Material in Liquid Filled Electrolytic Capacitors," *Electrocomponent Science and Technology*, 1:27–37 (1974).

*J. Electrochemical Society: Reviews and News*, 24(12):408C–409C (Dec. 1977).

Orlov et al., "Study of Oxygen Solubility in Niobium," *Izvestiya Akademii Nauk SSSR. Metally*, 5:202–205 (1985).

Krehl et al., "The Influence of Gas Atmospheres on the First–Stage Sintering of High–Purity Niobium Powders," *Metallurgical Transactions A*, 15A:1111–1116 (Jun. 1984).

Mifune et al., "Niobium Solid Electrolytic Capacitors," *National Technical Report* 9:147 (1963).

Levinsky et al., "Change in Porous Structure and Leakage Currents of Niobium Capacitor Anodes During Electrolytic Oxidation," *Poroshkovaya Metallurgiya*, 3:56–59 (1991).

Lichtenwalner et al., "Use of Ion Scattering Spectroscopy to Monitor Niobium Target Nitridation During Reactive Sputtering", *Mater, Res. Soc. Symp. Proc.*, (1991).

Fedorenko et al., "Layer Systems on the Base of Nitrogen–Doped Tantalum and Niobium with Enhanced Stability," *Cryst. Res. Technol.*, 32, (1997), 6, pp. 843–848.

Bairachnyi et al., "Preparation and Characterization Studies of Submicropores in Manganese Dioxide Semiconductor Films," *Thin Solid Films*, (1991), 201(1), L7–L8 CODEN:THSFAP; ISSN 0040–6090. (Abstract).

Naboka et al., "Mass–Spectrometric Determination of Hydrogen in High–Temperature Superconductor Materials," *Industrial Laboratory*, (1990), vol. 56, No. 8, pp. 950–955. (Abstract).

Skatkov et al., "Surface Fractal Dimension of Sintered Porous Solid Niobium," *Applied Surface Science*, (Dec. 1994), vol. 81, No. 4, pp. 427–429. (Abstract).

Skatkov et al., "Porous Solid Niobium as Fractal Structure," *Physica Status Solidi B–Basic Research*, (May 1994) vol. 183, No. 1, pp. K1–K3. (Abstract).

Pozdeev, Y., "Reliability Comparison of Tantalum and Niobium Solid Electrolytic Capacitors," *Quality and Reliability Engineering International*, (Mar.–Apr. 1998), vol. 14, No. 2, pp. 79–82. (Abstract).

Boiko et al., "Comparison of the Degradation Modes in Sandwich Structures including Amorphous Oxides of Niobium and Tantalum," *Thin Solid Films*, (Jun. 25, 1993), vol. 229, No. 2, pp. 207–215, ISSN: 0320–0116.

Boiko et al., "Composition and Electrical Properties of Oxide Films on Nitrided Niobium," *Izv. Vyssh. Uchebn. Zaved. Fiz.*, (1988), 31 (10), 115–16. (Abstract).

Boiko et al., "Structure Processes in a Niobium Layer in contact with Niobium Pentoxide," *Fiz. Khim. Obrab. Mater.*, (1988), (5), 61–7, CODEN:FKOMAT; ISSN 0015–3214. (Abstract).

Boiko et al., "Films of Amorphous Niobium Pentoxide Obtained by the Alcoholate Method on Niobium and Aluminum Substrates," *Izv. Akad. Nauk. SSSR Neorg. Mater.*, (1985), 21 (11), 1905–9. (Abstract).

Boiko et al., "Transformations in a Metal/Insulator/Semiconductor Structure with an Amorphous Insulator Film caused by Contacts," *Thin Solid Films*, (1985), 130 (3–4), 341–55, CODEN:THSFAP; ISSN: 0040–6090. (Abstract).

Boiko et al., "Nature of Current Instability in Niobium Pentoxide Amorphous Films after Electroforming," *Ukr. Fiz. Zh. (Russ. Ed.) Poverkhnost*, (1984), 29 (5), 760–5, CODEN:UFIZAW; ISSN: 0503–1265. (Abstract).

Boiko et al., "Current–Stimulated Structural Transformations in the Metal–Oxide–Semiconductor System," *Poverkhnost*, (1983), (12), 84–92, CODEN:PFKMDJ. (Abstract).

Boiko et al., "Interphase Interaction at the Oxide Boundary in Layered Systems," *Ukr. Fiz. Zh. (Russ. Ed.)*, (1982), 27 (11), 1684–8, CODEN:UFIZAW; ISSN: 0503–1265. (Abstract).

Palatnik et al., "Thermal Field Stability and Characteristics of the Crystallization of Amorphous Niobium(V) Oxide Films," *Fiz. Khim. Obrab. Mater.*, (1982), (5), 87–94, CODEN: FKOMAT; ISSN: 0015–3214. (Abstract).

Boiko et al., "Nature of the Electrical Forming of Niobium Pentoxide Amorphous Films," *Khar'k. Politekh. Inst., Kharkov., USSR, Ukr. Fiz., Zh. (Russ Ed.)*, (1981), 26 (11), 1892–7, CODEN: UFIZAW; ISSN: 0503–1265. (Abstract).

Palatnik et al., "Mechanism of the Change in the Electric Conductivity of Amorphous Oxide Films during their Heat Treatment," *Radiotekh. Elektron.*, (1978), 23 (4), 870–2, CODEN: RAELA4; ISSN: 0033–8494. (Abstract).

Palatnik et al., "Effect of Heat Treatment on the Structure of Anodic Niobium Oxide Films," *Fiz. Khim. Obrab. Mater.*, (1978), (2), 109–14, CODEN: FKOMAT; ISSN: 0015–3214. (Abstract).

Palatnik et al., "Method for Studying the Topology of Surface Sections in Layered Tantalum–Niobium–Tantalum Sheets," *Zavod. Lab.*, (1976), 42 (10), 1211–12, CODEN: ZVDLAU. (Abstract).

Palatnik et al., "Sign Inversion of Thermal Coefficient of Electrical Resistance of Amorphous Niobium(V) Oxide," *Mikroelektronika (Akad. Nauk SSSR)*, (1975), 4 (4), 372–5, CODEN: MKETA9. (Abstract).

Skatkov et al., "Ways of Stabilizing the Pore Structure in Sintered Powders Based on Niobium," *Fizika i Khimiya Obrabotki Materialov*, No. 5, (1996), pp. 117–120.

NITRIDED NIOBIUM POWDERS AND NIOBIUM ELECTROLYTIC CAPACITORS

This application is a continuation application of prior U.S. patent application Ser. No. 09/522,318 filed Mar. 9, 2000 now U.S. Pat. No. 6,338,861 which was a divisional application of U.S. patent application Ser. No. 09/071,537 filed May 4, 1998, now U.S. Pat. No. 6,051,044.

BACKGROUND OF THE INVENTION

The present invention relates to nitrided niobium powders and electrolytic capacitors using the nitrided niobium powders as well as methods of making the powders and electrolytic capacitors.

For many years, it has been the goal of various researchers to develop niobium electrolytic capacitors because of the high di-electric constant of its oxide and the relatively low cost of niobium compared to a variety of other metals. Initially, researchers in this field considered the possibility of using niobium as a substitute for tantalum capacitors. Accordingly, many studies were conducted to determine the suitability of replacing tantalum with niobium.

In some of these studies, however, it was concluded that niobium has serious fundamental deficiencies that needed to be resolved, thus inferring that niobium was not an acceptable substitute for tantalum. (See J. Electrochem. Soc. p.408 C, December 1977). In another study, one conclusion reached was that the use of niobium in solid electrolytic capacitors seems very unlikely due to various physical and mechanical problems, such as field crystallization. (Electrocomponent Science and Technology, Vol. 1, pp. 27–37 (1974)). Further, in another study, the researchers concluded that anodically formed passive films on niobium were different from electrical properties accomplished with tantalum and that the use of niobium led to complexities which were not present with tantalum. (See Elecrochimica Act., Vol. 40, no. 16, pp. 2623–26 (1995)). Thus, while there was initial hope that niobium might be a suitable replacement for tantalum, the evidence showed that niobium was not capable of replacing tantalum in the electrolytic capacitor market.

Besides tantalum electrolytic capacitors, there is a market for aluminum electrolytic capacitors. However, the aluminum electrolytic capacitors have dramatically different performance characteristics from tantalum electrolytic capacitors.

A driving force in electronic circuitry today is the increasing move toward lower Equivalent Series Resistance (ESR) and Equivalent Series Inductance (ESL). As IC performance increases with submicron geometry, there is a need for lower power supply voltage and noise margin. At the same time, increasing IC speeds require higher power needs. These conflicting requirements create a demand for better power management. This is being accomplished through distributed power supplies which need larger currents for decoupling noise. Increasing IC speeds also mean lower switching times and higher current transients. The electrical circuit must, therefore, also be designed to reduce the transient load response. This broad range of requirements can be met if the circuit has large enough capacitance but low ESR and ESL.

Aluminum capacitors typically provide the largest capacitance of all capacitor types. ESR decreases with increase in capacitance. Therefore, currently a large bank of high capacitance aluminum capacitors are used to meet the above requirements. However, aluminum capacitors do not really satisfy the designers' requirements of low ESR and ESL. Their mechanical construction with liquid electrolyte inherently produce ESR in the 100s of milliohm along with high impedance.

SUMMARY OF THE INVENTION

A feature of the present invention is to provide nitrided niobium powders.

A further feature of the present invention is to provide nitrided niobium powders, preferably having high surface areas and physical characteristics which permit the nitrided niobium powders to be formed into a capacitor having high capacitance.

Another feature of the present invention is to provide nitrided niobium powders which, when formed into capacitors, have a low DC leakage.

An additional feature of the present invention is to provide a method of reducing the DC leakage in a capacitor formed from nitrided niobium powder.

Additional features and advantages of the present invention will be set forth in part in the description which follows, and in part will be apparent from the description, or may be learned by practice of the present invention.

The present invention relates to a nitrided niobium powder. Another aspect of the present invention relates to any nitrided niobium powder having a BET surface area of at least about 0.15 $m^2/g$.

The present invention also relates to a nitrided niobium powder, which when formed into an electrolytic capacitor anode, the anode has a capacitance of 30,000 CV/g to about 61,000 CV/g.

Also, the present invention relates to a method to reduce DC leakage in a niobium anode made from nitrided niobium powder which comprises the step of introducing into the niobium powder a sufficient amount of nitrogen to reduce the DC leakage in a capacitor anode that is formed.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
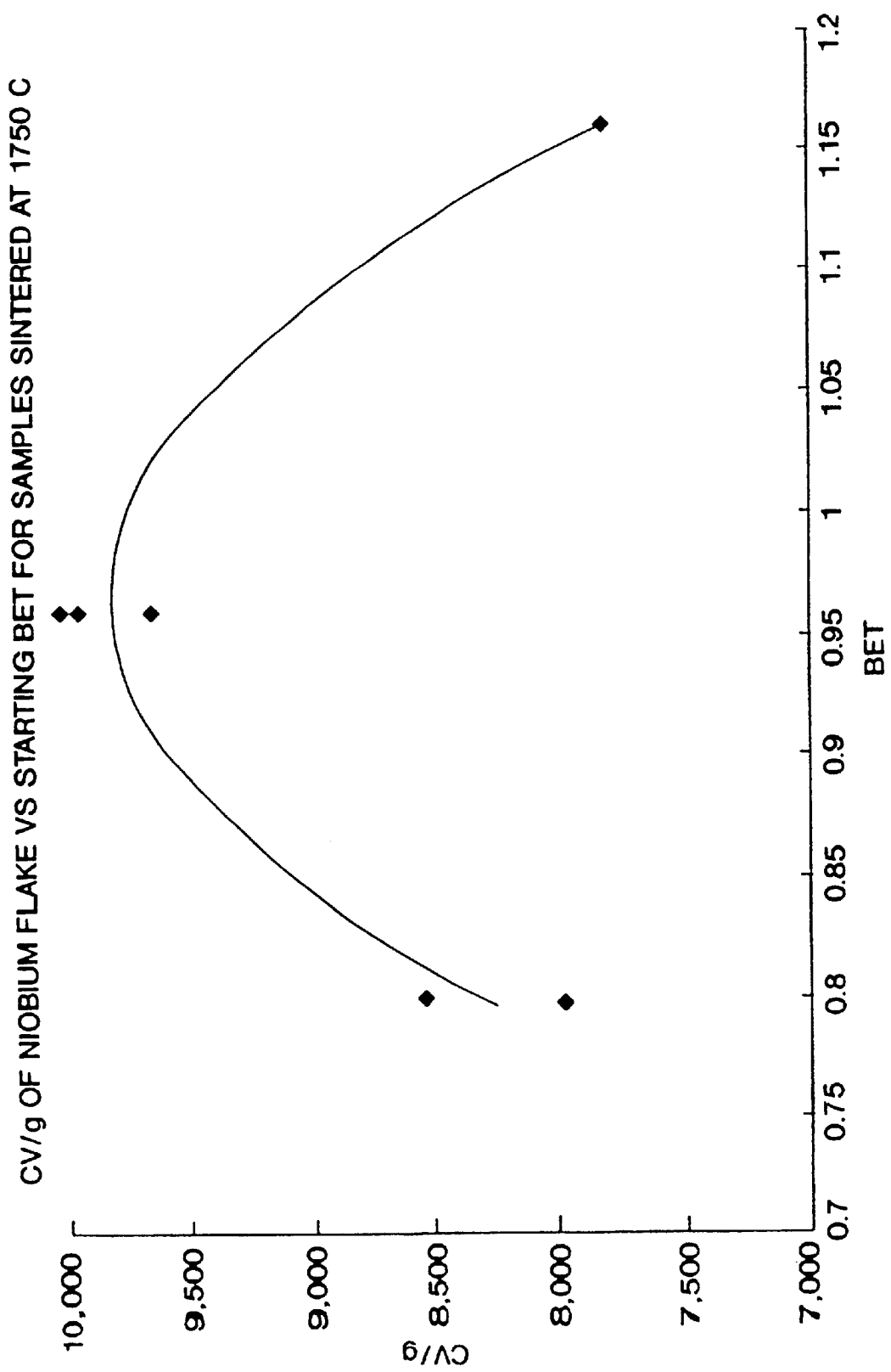
FIG. 1 is a graph showing the BET surface areas of niobium powders and their respective capacitance when formed into anodes and sintered at a temperature of 1750° C.

The present invention relates to niobium powders having nitrogen contained therein. The amount of nitrogen present is generally greater than nitrogen amounts found in niobium powders as impurities. The majority of the nitrogen present in the niobium powders of this embodiment is a result of intentional conditions which lead to increased levels of nitrogen in the niobium powders (i.e., nitriding of the niobium). The nitrogen present in the niobium can be accomplished in any manner. For instance, the nitrogen can be introduced (e.g., doped) into the niobium during any processing stage of the niobium, such as during one or more of the following stages: melting of a niobium ingot; a deoxidation stage; hydriding of the niobium; delubing of the niobium; any sintering of the niobium (e.g., such as sintering of the niobium capacitor anode); any thermal processing of the niobium; any heat treatment stage; or anytime before or after any one or more of these processing steps or stages.

Any means can be used to nitride the niobium material, such as, but not limited to, exposure to nitrogen containing environments (e.g., N2 gas) or nitrogen-containing materials, preferably during a thermal cycling to defuse the nitrogen in the material (e.g., preparing a solid-solution of nitrogen by reaction of nitrogen containing materials by diffusion from direct physical contact or gas adsorption and/or absorption.).

One of the benefits of nitrogen in the niobium is a decrease in DC leakage for capacitors made at least in part from the niobium powder. The amount of nitrogen in the niobium can be any amount and preferably amounts which do not lead to detrimental properties of the niobium powder or articles made from the niobium powder. Preferred amounts of the nitrogen are amounts which reduce the DC leakage of capacitors made from niobium powders. Some of the examples show that there is a point of diminishing return and that at certain levels of nitrogen, there is no added benefit with respect to reducing DC leakage. Generally, the amount of nitrogen present is at least about 300 ppm, and can be at least about 400 ppm or at least about 500 ppm or higher. The nitrogen range can be from about 300 ppm to about 5,000 ppm and other ranges can be from about 500 ppm to about 4,000 ppm; from about 500 ppm to about 3,500 ppm; 1,500 ppm to about 5,000 ppm; and/or from about 500 ppm to about 3,000 ppm nitrogen.

With respect to DC leakage of capacitors made from the nitrided niobium, various decreases of the DC leakage can be observed. Generally, decreases of about 50% or less, or 25% or less, can be achieved by nitriding the niobium, compared to niobium powder having substantially no nitrogen (e.g., less than 100 ppm nitrogen).

The amount of nitrogen in the niobium powder and the benefits achieved from the presence of nitrogen can be based in part on the forming voltage of the capacitor as well as the sintering temperature of the niobium powder. Preferably the sintering temperature is from about 1200° C. to about 1750° C., and more preferably from about 1300° C. to about 1600° C. Generally, the higher the sintering temperature, the lower the DC leakage. Accordingly, high sintering temperatures are preferred. Also, for purposes of this embodiment, the forming voltage of the capacitor made from the niobium powder with nitrogen can be any forming voltage suitable for capacitors made in part from niobium such as about 50 volts or less or ranges from about 30 volts to about 50 volts. Other ranges of forming voltages can be from about 30 to about 35 volts or less (25, 20, 15, 10, 5 volts) since lower forming voltages can also contribute to lowering DC leakage.

The niobium that can be used in this embodiment is any niobium powder, such as flaked, angular, nodular, and mixtures or variations thereof. Any of the embodiments set forth and/or described below can also be subjected to conditions which will lead to niobium powders having the above-described nitrogen amounts.

With respect to the flaked niobium powder, the flaked niobium powder can be characterized as flat, plate shaped, and/or platelet. Also, the flaked niobium powder can have an aspect ratio (ratio of diameter to thickness) of from about 3 to about 300, and preferably, from about 3 to about 30. The flaked niobium powder permits enhanced surface area due to its morphology. Preferably, the BET surface area of the flaked niobium powder is at least 0.15 $m^2/g$ and more preferably, is at least about 1.0 $m^2/g$ and even more preferably, is at least about 2.0 $m^2/g$. Preferred ranges of BET surface area for the flaked niobium powder are from about 1.0 $m^2/g$ to about 5.0 $m^2/g$ and more preferably from about 2.0 $m^2/g$ to about 5.0 $m^2/g$ or from about 2.0 $m^2/g$ to about 4.0 m²/g. The BET ranges are based on pre-agglomerated flaked niobium powders.

The flaked niobium powder can be agglomerated. The flaked niobium powder can also be hydrided or non-hydrided. The agglomerated flaked niobium powder preferably has a Scott Density of less than about 35 g/in³, and more preferably about 10 to about 35. The unagglomerated flaked niobium powder preferably has a Scott Density of less than about 12, and more preferably, less than about 5 g/in³. Preferably, the agglomerated flaked niobium powder has a flow of greater than 80 mg/s, more preferably from about 80 mg/s to about 500 mg/s.

The flaked niobium powder can be prepared by taking a niobium ingot and making the ingot brittle by subjecting it to hydrogen gas for hydriding. The hydrided ingot can then be crushed into an angular powder, for instance, with the use of a jaw crusher. The hydrogen can then be removed by heating in a vacuum and the degassed angular powder can then be subjected to milling, such as with use of a stirred ball mill where the powder is dispersed in a fluid medium (aqueous or non-aqueous) such as ethanol, to form the flaked powder by the impact of the stainless steel balls moved by the action of rotating bars. Various sizes of flakes can be made by hydrogen embrittlement followed by subjecting the flakes to impact milling, for example with use of a fluidized bed jet mill, Vortec milling, or other suitable milling steps.

The flaked niobium powder can optionally have a high oxygen content, such as by doping or other oxygen introduction methods. The amount of oxygen doping content can be at least about 2,000 ppm. More preferably, the flaked niobium powder has an oxygen content of from about 2,000 ppm to about 20,000 ppm and more preferably from about 2,750 ppm to about 10,000 ppm, and most preferably from about 4,000 ppm to about 9,000 ppm. The doping of the niobium powder with oxygen can be done in a variety of ways including, but not limited to, repeated heating in vacuum at 900° C. and cooling in air. Alternatively, the flaked niobium or any other type of niobium can have a low oxygen content, such as less than 1,000 ppm.

Further, the flaked niobium powder can be also doped with phosphorus alone or with oxygen. The doping of the niobium powder with phosphorus is also optional. In one embodiment of the present invention, the amount of phosphorus doping of the niobium powder is less than about 400 ppm and more preferably less than about 100 ppm, and most preferably less than about 25 ppm.

Based on an example set forth herein, the amount of phosphorus doping can be unimportant with respect to the DC leakage and capacitance of an anode formed from a niobium powder having various levels of phosphorus as a dopant. Accordingly, in one embodiment, low amounts of phosphorus and even negligible amounts or no phosphorus is present since phosphorus can have small or no benefits for DC leakage and capacitance with respect to certain anodes formed from niobium powders.

Other examples of niobium powders include niobium powder (e.g., flaked, angular, nodular, and mixtures thereof) having a significant level of oxygen present in the niobium powder. The oxygen level can be achieved in the same manner as described above. Preferably, the amount of oxygen in the niobium powder is at least about 2,000 ppm, and more preferably from about 2,000 ppm to about 20,000 ppm. Other preferred ranges of oxygen content in niobium powder are from about 2,750 ppm to about 10,000 ppm and levels of from about 4,000 ppm to about 9,000 ppm. With respect to these niobium powders, like the embodiment relating to the flaked niobium powder only, the phosphorus levels in the niobium powders can be considerably low for certain embodiments. Preferably, in such embodiments, the phosphorus level (as a dopant) is less than about 400 ppm and more preferably less than about 100 ppm, and most preferably less than about 25 ppm.

Another example of niobium powders are niobium powders (e.g. flaked, angular, nodular, and mixtures thereof) having a BET surface area of at least 0.5 m²/g and preferably, at least about 1.0 m²/g, and more preferably from about 1.0 to about 5.0 m²/g, and most preferably from about 2.0 to about 5.0 m²/g. The BET ranges are based on pre-agglomerated niobium powders. The niobium powder can be hydrided or non-hydrided. Also, the niobium powder can be agglomerated. The niobium powder in this embodiment can be doped with nitrogen. Also, for certain uses, the niobium powder can have an oxygen content below about 2,000 ppm.

With respect to making the flaked niobium powder or the niobium powder having any morphology with the BET surface area, the examples show the preferred steps of forming the niobium powder which can then subsequently be made into a flake or other morphology. In general, the process is as follows and the examples provide specific details as to preferred embodiments of making the niobium powders of the present invention.

Generally, in preparing the niobium powders having a BET surface area of at least 0.5 m²/g, a niobium ingot is hydrided by heating in a vacuum to form an embrittled ingot which is crushed into a powder. The hydrogen in the powders can optionally be removed by heating the particle in a vacuum. The various BET surface areas can be achieved by subjecting the powder to milling, preferably an attritor milling process. The higher the BET surface area of the powder generally will require a longer milling time. For instance, with a milling time of approximately 60 minutes a BET surface area of approximately 1.0 m²/g can be achieved. To obtain even higher BET surface areas, longer milling times will be needed and to achieve the BET surface area of from about 4 to about 5 m²/g or greater, milling times on the order of approximately 24 hours or more in an attritor mill is one way of making such niobium powders having high BET surface area ranges. When making such high surface areas, it is preferred to use a 30-SL Union Process attritor mill using 1,000 lbs 3/16" SS media, and approximately 80 pounds of niobium powder with the mill set at a rotation of approximately 130 rpm. Also, the mill will contain a sufficient amount of a medium such as ethanol on the order of 13 or more gallons. After milling, the niobium powders are then subjected to a heat treatment and preferably the niobium powders can have a phosphorus content to help in minimizing the reduction in surface area during the heat treatment. The heat treatment can be any temperature sufficient to generally cause agglomeration and preferably without reducing the surface area. A temperature for heat treatment which can be used is approximately 1100° C. for 30 minutes. However the temperature and time can be modified to ensure that the high BET surface area is not reduced.

The various niobium powders described above can be further characterized by the electrical properties resulting from the formation of a capacitor using the niobium powders of the present invention. In general, the niobium powders of the present invention can be tested for electrical properties by pressing the niobium powder into an anode and sintering the pressed niobium powder at appropriate temperatures and then anodizing the anode to produce an electrolytic capacitor anode which can then be subsequently tested for electrical properties.

Accordingly, another embodiment of the present invention relates to capacitors formed from the nitrogen containing niobium powders of the present invention. Anodes made from some of the niobium powders of the present invention can have a capacitance of from 30,000 CV/g to about 61,000 CV/g. In forming the capacitor anodes of the present invention, a sintering temperature is used which will permit the formation of a capacitor anode having the desired properties. Preferably, the sintering temperature is from about 1200° C. to about 1750° C., and more preferably from about 1200° C. to about 1400° C., and most preferably from about 1250° C. to about 1350° C.

The capacitor anode of the present application can be prepared from a formulation containing the niobium powder of the present invention.

The anodes formed from the niobium powders of the present invention are preferably formed at a voltage of less than about 60 volts, and preferably from about 30 to about 50 volts and more preferably at about 40 volts. Lower forming voltages are also possible, such as about 30 volts or less. Preferably, the working voltages of anodes formed from the niobium powders of the present invention are from about 4 to about 16 volts and more preferably from about 4 to about 10 volts. Also, the anodes formed from the niobium powders of the present invention preferably have a DC leakage of less than about 5.0 na/CV. In an embodiment of the present invention, the anodes formed from some of the niobium powders of the present invention have a DC leakage of from about 5.0 na/CV to about 0.50 na/CV.

The present invention also relates to a capacitor in accordance with the present invention having a niobium oxide film on the surface thereof. Preferably, the niobium oxide film comprises a niobium pentoxide film.

The capacitors of the present invention can be used in a variety of end uses such as automotive electronics; cellular phones; computers, such as monitors, mother boards, and the like; consumer electronics including TVs and CRTs; printers/copiers; power supplies; modems; computer notebooks; and disk drives.

The present invention will be further clarified by the following examples, which are intended to be exemplary of the invention.

Test Methods

Anode Fabrication:
   size—0.197" dia
   3.5 Dp
   powder wt=341 mg
Anode Sintering:
   1300 Deg C.* 10'
   1450 Deg C.* 10'
   1600 Deg C.* 10'
   1750 Deg C.* 10'
30V Ef Anodization:
   30V Ef @ 60 Deg C./0.1% $H_3PO_4$ Electrolyte
   20 mA/g constant current
DC Leakage/Capacitance—ESR Testing:
   DC Leakage Testing———
   70% Ef (21 VDC) Test Voltage
   60 second charge time
   10% $H_3PO_4$ @21 Deg C.
   Capacitance—DF Testing:
   18% $H_2SO_4$ @21 Deg C.
   120 Hz 50V Ef Reform Anodization:
   50V Ef @60 Deg C./0.1% $H_3PO_4$ Electrolyte
   20 mA/g constant current
DC Leakage/Capacitance—ESR Testing:
   DC leakage Testing———
   70% Ef (35 VDC) Test Voltage
   60 second charge time
   10% $H_3PO_4$ @21 Deg C.
   Capacitance—DF Testing:
   18% $H_2SO_4$ @21 Deg C.
   120 Hz
75V Ef Reform Anodization:
   75V Ef @60 Deg C./0.1% $H_3PO_4$ Electrolyte
   20 mA/g constant current
DC Leakage/Capacitance—ESR Testing:
   DC leakage Testing———
   70% Ef (52.5 VDC) Test Voltage
   60 second charge time
   10% $H_3PO_4$ @21 Deg C.
   Capacitance—DF Testing:
   18% $H_2SO_4$ @21 Deg C.
   120 Hz Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein.

EXAMPLE 1

This example illustrates an embodiment of this invention comprising angular niobium powder. Electron beam produced niobium ingot was hydrided by heating the ingot in a vacuum of $10^{-4}$ torr to 850° C. for 120 minutes. The vacuum was replaced by hydrogen gas purge at 21 kPa for sufficient time to embrittle the ingot. The vacuum was then pumped down to −28" mercury and then backfilled with argon to −5" Hg. The pressure was maintained until the temperature, as measured by a work thermocouple, stabilized. Air was gradually introduced in increasing pressure such that the work temperature did not rise. The embrittled ingot was crushed into angular powder in a jaw crusher and classified by extracting powder which passed through a No. 325 sieve screen (equivalent to a 44 micrometer particle size). Hydrogen was removed from the size-reduced hydrogen-containing particles by heating the particles to 850° C. in a vacuum until pressure was no longer affected by hydrogen being emitted from the particles to provide niobium metal angular powder having a Fisher Sub Sieve Size of 10.6 micrometers, a Scott density of 2.67 g/cc (43.8 g/in$^3$), a pre-agglomerated BET surface area of 0.17 m$^2$/g and 1770 ppm oxygen; the ratio of oxygen to BET surface area was 10,400 ppm O/m$^2$/g, and the flow was 19 mg/sec. About 0.34 g samples of unagglomerated angular niobium powder were pressed into an anode mold 5 mm in diameter around a 0.6 mm diameter niobium lead wire to a density of 3.5 g/cc. Samples of the pressed niobium powder were sintered in a vacuum (at less than $10^{-3}$ Pa) at four different temperatures, i.e. 1300, 1450, 1600 and 1750° C. for 10 minutes, then anodized by applying 20 mA/g constant current at 50 V to the anode immersed in 0.1 weight percent phosphoric acid to produce electrolytic capacitor anodes, which were washed and dried. The capacitor performance characteristics, evaluated by measurements on the anodes immersed in 18 wt % sulfuric acid, are reported in Table 1. Capacitance, determined at a frequency of per gram (CV/g) and microfarad volts per cubit centimeter of anode volume (CV/cc); DC leakage, measured after a 1 minute charge of 35 volts, is reported in units of nanoamperes per microfarad-volt (nA/CV).

EXAMPLE 2

This example illustrates an embodiment of the powder of this invention comprising agglomerated mixture of angular and flaked powder. 2.5 lbs of degassed angular powder prepared essentially in the manner of Example 1 was processed in a 1-S Union Process attritor stirred ball mill (285 rpm for 90 minutes) where powder dispersed in 2,400 ml ethanol medium and 40 lbs 3/16" 440SS medium was formed into flaked powder by the impact of stainless steel balls moved by the action of rotating bars. After the desired deformation into flake, the niobium powder was then removed and washed to remove any alcohol present. The niobium powder was then washed with a mixture of deionized water, hydrofluoric acid and hydrochloric acid in an amount of 500 ml/lb, 4 ml/lb and 250 ml/lb of niobium respectively (18.6% HCl containing 22 ml/kg HF) to remove metal contamination (e.g. iron, nickel, chromium and the like transferred from contact with stainless steel balls). Afterwards, the niobium powder was again washed with deionized water and then dried. The acid washed flaked powder was dried in air at 85° F. (30° C.) and had an aspect ratio (determined by observation of micrographs) in the range of 50 to 70. The flaked powder was blended with starting angular powder (in the weight ratio of 30:70) and with a phosphorus containing powder, i.e. $NH_4PF_6$, in an amount to provide 60 ppm phosphorus, which serves as a grain retarding agent to minimize the reduction in surface area during subsequent heat treatment for agglomeration. The pre-agglomerated BET surface area was 0.31 $m^2/g$. The mixed powders were agglomerated by heating in a vacuum at 1100° C. for 30 minutes to form an agglomerated mass. The agglomeration procedure was performed in a manner such that the material was pumped down to a high vacuum and heated at a ramp rate of 3° C./minute to 700° C. and held for outgassing until the high pressure was achieved. The heating continued in the furnace at a ramp rate of 8° C./minute to 1100° C. under high pressure and held for 30 minutes. The material was then allowed to cool in the furnace and the material was manually passivated by exposing it to air. The material was then reduced to smaller agglomerated particles by jaw crushing; reduced particles passing a No. 50 sieve size (equivalent to a maximum agglomerated particle size of 300 micrometers) exhibited a Scott density of 1.3 g/cc (21.7 $g/in^3$), a BET surface area of 0.26 $m^2/g$, oxygen content of 3693 ppm and phosphorus content of 25 ppm; the ratio of oxygen to BET surface area was 14,000 ppm $O/m^2/g$ and a flow of 22 mg/sec. The agglomerated powder was fabricated into anodes and tested for electrical properties in the manner of Example 1 which are reported in the Table 1.

EXAMPLE 3

This example illustrates an embodiment of the powder of this invention comprising agglomerated flaked powder. Acid leached flaked powder having an aspect ratio of about 50 to 70 was prepared essentially as described in Example 2 (cycle time of 60 minutes) except the niobium powder was hydrided a second time by exposure to hydrogen at 20.7 kPa (3 psig) and 850° C. to provide an embrittled flake which was cooled and reduced in size by self impaction in a fluidized bed Jet mill (obtained from Hosokawa Micron Powder Systems, Summit, N.J.) to make flaked powder having a median particle size of 6 micrometers (as determined by laser particle size scanning). The pre-agglomerated BET surface area was 0.62 $m^2/g$. The reduced-size flaked powder was agglomerated by heating in a hydrogen atmosphere by heating the furnace at a rate of 10° C./minute to 1050° C. under a vacuum furnace and holding this temperature until the furnace pressure decreased below 100 microns. Tantalum coarse chips (10–20 mesh) were used as an oxygen getter in a weight ratio of 1 Nb to 1–1.5 Ta. The furnace was then backfilled with hydrogen to obtain a pressure of 360 mmHg and the furnace temperature was then increased to 1200° C. and held for 1 hour. The hydrogen was then evacuated until the furnace pressure decreased to less than 1 micron and the furnace was allowed to cool to room temperature. The niobium powder was then passivated in air for 30 cycles wherein the operating pressure was increased by 20 torr for each cycle and held for 2 minutes before starting the next backfill of air. The agglomerated niobium powder was reduced in size to agglomerated particles by a jaw crusher; reduced agglomerated flaked niobium powder was separated by screening through a No. 50 sieve size screen (equivalent to a maximum agglomerated flaked particle size of 300 micrometers) and exhibited a Scott density of 1.21 g/cc (20.4 $g/in^3$), a BET surface area of 0.46 $m^2/g$, oxygen content of 8760 ppm; the ratio of oxygen to BET surface area was 19,000 ppm $O/M^2/g$, and a flow of less then 1 mg/sec. The agglomerated powder was fabricated into anodes and tested for electrical properties in the manner of Example 1 and reported in Table 1.

EXAMPLE 4

This example illustrates another embodiment of the powder of this invention comprising high surface area, low oxygen, agglomerated niobium flaked powder. Niobium powder was prepared in the same manner as in Example 3 except the niobium powder was attritor milled for 90 minutes, and heat treatment was carried out in a vacuum at 1150° C. for 30 minutes. The pre-agglomerated BET surface area was 0.85 $m^2/g$. The oxygen content of quantities of flaked niobium powder prepared essentially in the manner of Example 3 was reduced by heating niobium powder admixed with 4 to 5 wt % magnesium powder under argon at a temperature in the range of 750 to 850° C. for 2 hours. The magnesium content was established as being in the range of 2 to 3 times the stoichiometric amount of oxygen in the niobium powder. After cooling, residual magnesium and oxides were removed from agglomerated flaked niobium by nitric acid leach. Deoxidized flaked niobium was water washed, dried, and separated by screening through a No. 50 sieve size screen. The screened niobium flake exhibited a Scott density of 1.47 g/cc (24.1 $g/in^3$), a BET surface area of 0.96 $m^2/g$, an oxygen content of 3130 ppm; the ratio of oxygen to BET surface area was 3260 ppm $O/m^2/g$, and a flow of 76 mg/sec. The agglomerated powder was fabricated into anodes and tested for electrical properties in the manner of Example 1, and reported in Table 1.

TABLE 1

| | Sinter temperature | | | |
| --- | --- | --- | --- | --- |
| | 1300° C. | 1450° C. | 1600° C. | 1750° C. |
| Example 1: | | | | |
| Capacitance | | | | |
| (CV/g) | 8400 | 7500 | 6400 | 5500 |
| (CV/cc) | 40900 | 37000 | 33400 | 30000 |
| DC Leakage (na/CV) | 53 | 2.8 | 2.3 | 2.4 |
| Sinter Density (g/cc) | 4.9 | 5.0 | 5.2 | 5.5 |

TABLE 1-continued

| | Sinter temperature | | | |
|---|---|---|---|---|
| | 1300° C. | 1450° C. | 1600° C. | 1750° C. |
| Example 2: | | | | |
| Capacitance | | | | |
| (CV/g) | 13600 | 11900 | 10000 | 8200 |
| (CV/cc) | 46000 | 41600 | 36900 | 33400 |
| DC Leakage (na/CV) | 25 | 1.7 | 2.1 | 2.5 |
| Sinter Density (g/cc) | 3.4 | 3.5 | 3.7 | 4.1 |
| Example 3: | | | | |
| Capacitance | | | | |
| (CV/g) | 32500 | 21400 | 13400 | 7100 |
| (CV/cc) | 114100 | 94300 | 73600 | 45800 |
| DC Leakage (na/CV) | 5.8 | 4.1 | 2.4 | 2.0 |
| Sinter Density (g/cc) | 3.5 | 4.4 | 5.5 | 6.4 |
| Example 4: | | | | |
| Capacitance | | | | |
| (CV/g) | 31,589 | 21,059 | 12,956 | 7,254 |
| (CV/cc) | 110,562 | 88,448 | 64,780 | 42,799 |
| DC Leakage (na/CV) | 5.8 | 5.3 | 2.6 | 1.4 |
| Sinter Density (g/cc) | 3.5 | 4.2 | 5.0 | 5.9 |

EXAMPLE 5

A niobium powder was prepared in the same manner as in Example 4 except the heat treatment occurred in a vacuum at 1250° C. for 30 minutes. The pre-agglomerated BET surface area was 0.78 $m^2/g$. The powder was formed into an anode as in Example 1 and had the following performance characteristics

| Cv/g @ 50 Vf | 19,600 (1450° C.) | 31,040 (1300° C.) |
|---|---|---|
| Sinter Density, g/cc | 4.8 (1450° C.) | |
| DC Leakage, na/Cv | 2.33 (1450° C.) | |
| BET, $m^2/g$ | 0.80 | |
| Oxygen, ppm | 2,815 | |
| Scott Density, G/$in^3$ | 24.0 | |
| Flow, mg/sec | 97 | |

EXAMPLE 6

A niobium powder was prepared in the same manner as in Example 4 except the niobium powder was in an attritor mill for 150 minutes and the heat treatment was in a vacuum furnace where the pressure was pumped down to 1 micron and then the temperature was increased by 50° C./minute to 950° C. and held until the high vacuum was achieved. The temperature was then increased by 15° C. stages until a temperature of 1250° C. was reached and that temperature was held for 30 minutes. The material was then allowed to cool to room temperature under vacuum and passivated for 30 cycles, wherein the pressure was increased by 20 torr after each cycle and held for 2 minutes before starting the next backfill of air. The powder was then crushed in a −50 mesh jaw crusher and deoxidized by blending the powder with 4% w/w magnesium metal and placing the material in a retort furnace and pumping down to 100 microns. The pre-agglomerated BET surface area was 1.05 $m^2/g$. The furnace was then backfilled with argon to a pressure of 800 torr and the pressure increased to 800° C. and held for 2 hours. The material was then allowed to cool to room temperature and passivated in air for 30 cycles in the same manner mentioned above in Example 3. The material was then washed with a mixture of deionized water (500 ml/lb), hydrofluoric acid (4 ml/lb) and nitric acid (250 ml/lb). The powder was then rinsed with deionized water and dried. The niobium powder was then formed into an anode as in Example 1 and had the following performance characteristics

| CV/g @ 50 Vf (Sintering Temp.) | 24,300 (1450° C.) 41,700 (1300° C.) |
|---|---|
| Sinter Density, g/cc | 4.0 (1450° C.) |
| DC Leakage, na/Cv | 1.5 (1450° C.) |
| BET, $m^2/g$ | 1.11 |
| Oxygen, ppm | 3,738 |
| Scott Density, g/$in^3$ | 24.4 |
| Flow, mg/sec | 112 |

EXAMPLE 7

Niobium powder was prepared in the same manner as in Example 6 except the niobium powder was blended with phosphorus before heat treatment to achieve a phosphorus loading of 56 ppm. The pre-agglomerated BET surface area was 1.05 $m^2/g$. The material was hydrided as in Example 3 and crushed, heat treated, and deoxidized as in Example 6. The niobium powder was then formed into an anode as in Example 1 and had the following performance characteristics

| Cv/g @ 50 Vf (Sintering Temp.) | 29,900 (1450° C.) 45,400 (1300° C.) |
|---|---|
| Sinter Density, g/cc | 3.7 (1450° C.) |
| DC Leakage, na/Cv | 1.3 (1450° C.) |
| BET, $m^2/g$ | 1.07 |
| Oxygen, ppm | 3,690 |
| Scott Density, g/$in^3$ | 23.2 |
| Flow, mg/sec | 76 |

EXAMPLE 8

Niobium powder was prepared in the same manner as in Example 4 except the niobium powder was milled in a 30 S attritor mill (130 rpm) for 8 hours by using 1,000 lbs of 3/16" SS media, 80 lbs of niobium powder, and 13 gallons of ethanol. The milled powder was acid leached and washed in the same manner as described before and the material had the following characteristics

| BET, $m^2/g$ | 1.39 |
|---|---|
| Oxygen, ppm | 8,124 |
| Scott Density, g/$in^3$ | 3 |

The niobium powders of examples 1–8 were discovered to have nitrogen levels on the order of about 1,000 ppm to about 2,000 ppm N2 as a result of air leaking into a furnace during the degassing of the Nb ingot chip.

EXAMPLE 9

FIGS. 1, 2, 3, and 4 show CV/g vs BET for various Nb powders having a range of BETs. Each figure represents the measurement of CV/g for the powders determined at a specific sinter temperature. As the figures show, the higher the sinter temperature the greater is the loss of surface area of the anode and there is also a general reduction in CV/g for any particular powder sample as the sample is tested at higher sinter temperatures (CV/g is proportional to the residual specific surface area of the anode after sintering).

As illustrated by FIGS. 1 through 4, for any given sinter temperature, the CV/g achieved will have a relationship to the starting BET of the sample. As shown, low BET will produce low net CV/g and as BET rises the CV/g will rise. For materials having high BETs the degree of surface area loss during sintering is so great as to obliterate so much surface area that only a small fraction of the original high BET is left to be expressed as CV/g after the sinter so CV/g drops off with the highest BETs. For this reason, the response of CV/g vs BET shows a maximum at a BET value that preserves the most net specific surface area after sintering. In general, as shown in the figures, lower sinter temperature will achieve optimum CV/g with higher BET material; whereas, high sinter temperatures, which are very destructive to small, high BET particles, will achieve optimum CV/g with a lower BET powder.

Figure 2:
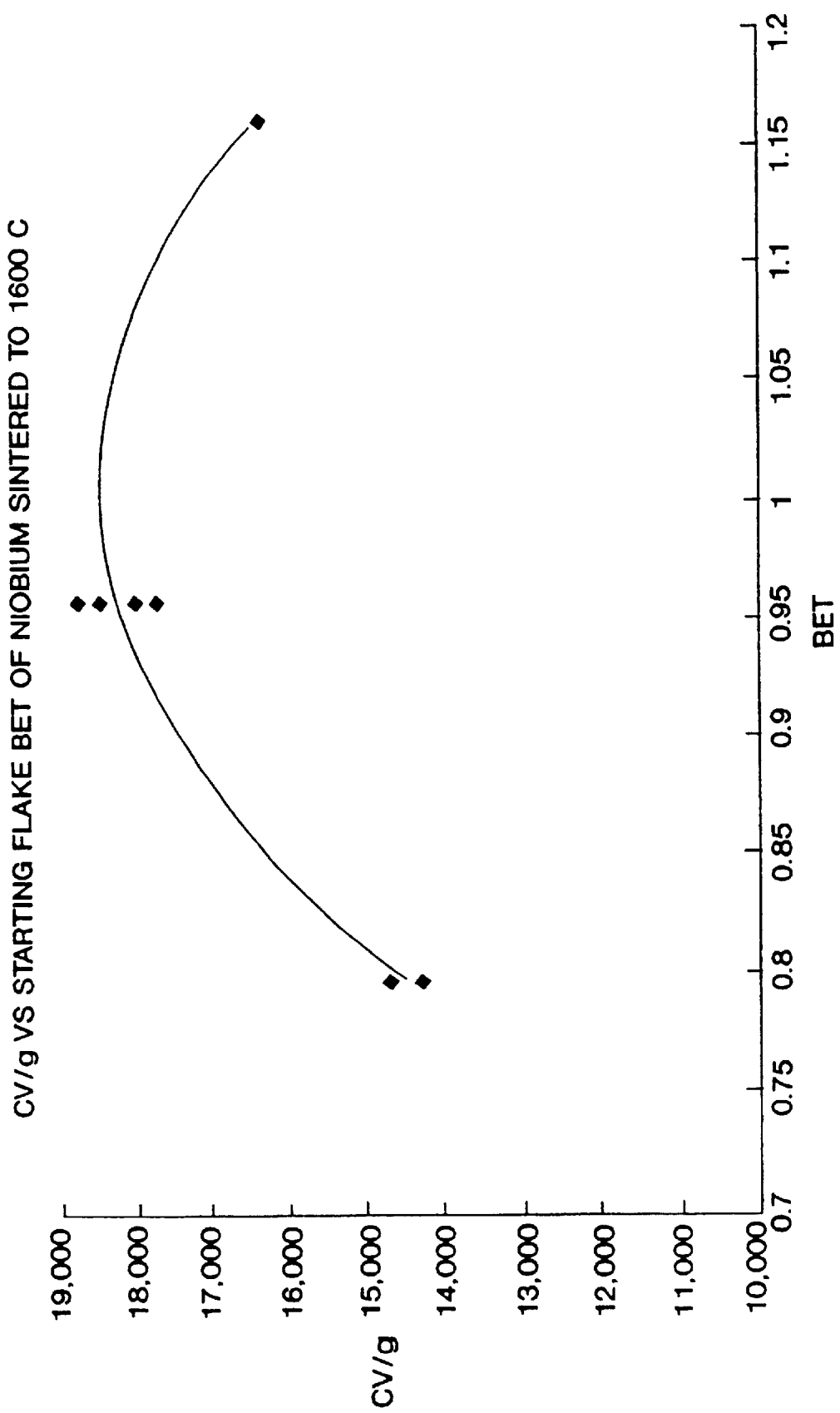
FIG. 2 is a graph depicting the BET surface areas of niobium powders and their respective capacitance when formed into anodes and sintered at a temperature of 1600° C.
Figure 3:
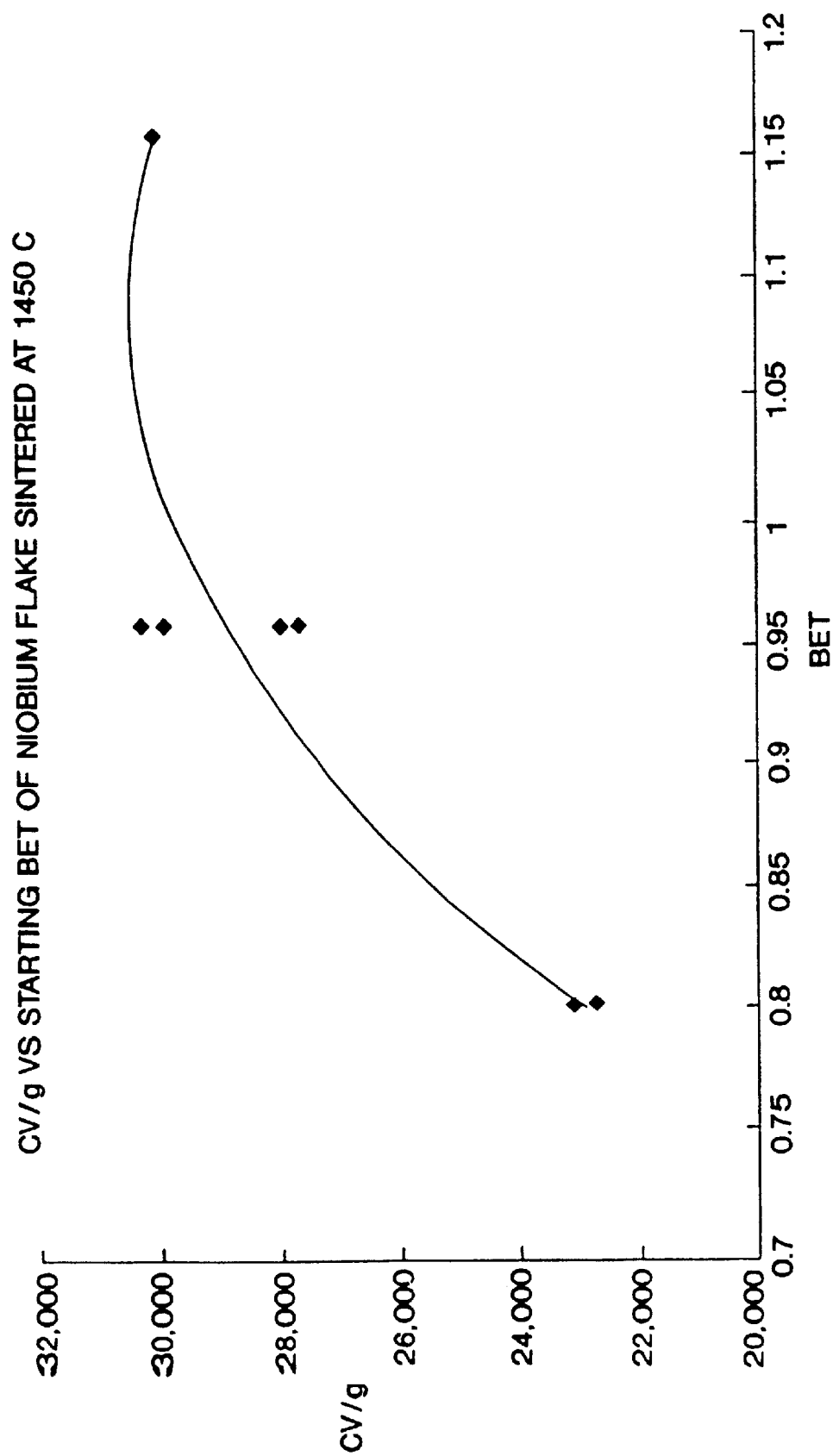
FIG. 3 is a graph depicting the BET surface areas of a niobium powders and their respective capacitance when formed into anodes and sintered at a temperature of 1450° C.
Figure 5:
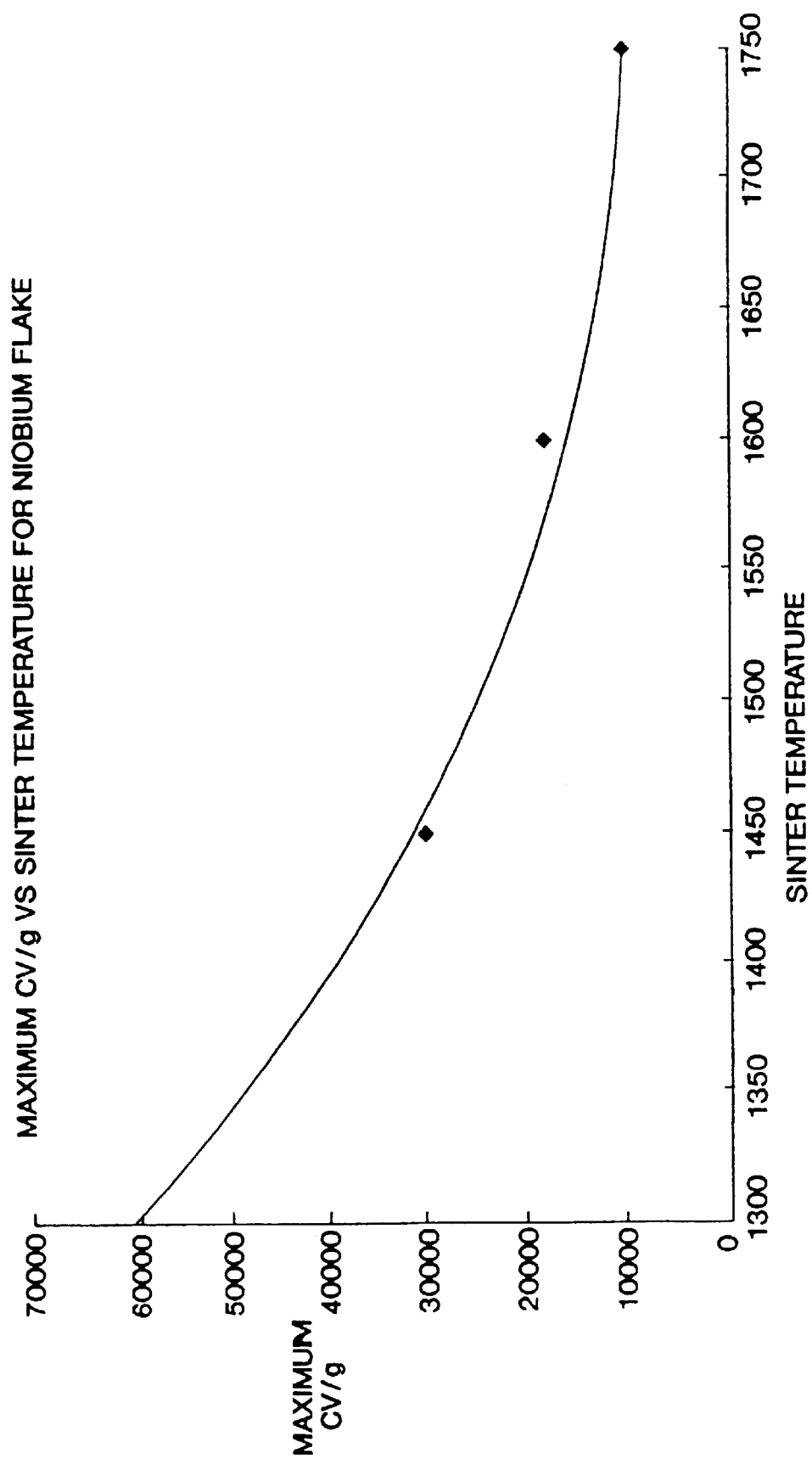
FIG. 5 is a graph showing various sintering temperatures of niobium anodes and their respective calculated maximum capacitance.

There is generally an optimum BET for use at any given sinter temperature; and, the set of all optimum BETs form a response surface relative to the sinter temperatures. As shown in the figures, the CV/g is generally proportional to the BET, and CV/g shows a relationship to the sinter temperatures. Thus, FIG. 5 shows the CV/g for each sinter temperature from FIGS. 1 through 3 plotted against the sinter temperature. FIG. 5 shows the CV/g that would be achieved at the 1300° C. sinter to be on the order of about 61,000.

The preparation of FIG. 5 is based on an objective and mathematically correct procedure for determining the maximum CV/g from each of the FIGS. 1 through 3. Because the response of CV/g vs BET in each of FIGS. 1 through 3 is observed to exhibit a maximum, the requirement was resolved by finding the maximum of the best functional fit to the data for each figure. The actual response of CV/g to BET is a complex function of the variables; however, the Taylor Series expansion of functions teaches that all functions can be approximated by the first three terms of the Taylor Series within a limited domain of the independent variable (in this case BET). This amounts to approximating the function as a quadratic ($F(x)=ax^2+bx+c$) valid within a limited neighborhood of any selected value for x. This calculation is valid as long as the values of x are within the neighborhood. The optimum BET in each case was used as the center of the neighborhood of the BET domain so that the approximation is most valid for BET near this value; and, to therefore take the maximum of the quadratic fit to the data to be the best estimate for the peak CV/g of the data in FIGS. 1 through 3. For this reason, a best fit of the data was performed in FIGS. 1 through 3 to a quadratic function using the curve fitting tool in Microsoft Excel v 5.0 which generated the parabolic curves superimposed on the measured data in FIGS. 1 through 3. The maximum of the fitted parabolae in FIGS. 1 through 3 were used as the input data to make FIG. 5.

The set of maximum CV/g vs sinter temperature data in FIG. 5 was next fitted to an exponential decay function using the curve fitting tool in Microsoft Excel v 5.0. The reason for selecting exponential decay as the best approximation to the response of maximum CV/g vs sinter temperature is because, as shown in the figures, CV/g will decrease with increasing sinter temperature; however, CV/g can in principal never be lower than 0.0 because the specific surface area cannot be made less than zero (cannot be negative). The exponential function which asymptotically decays to zero is the simplest functional form that can be used with the data in FIG. 5 that does not predict negative CV/g. The best fit of an exponential curve as determined by Microsoft Excel v 5.0 was added to the data in FIG. 5 and this allowed the calculation of the maximum CV/g that would be achieved with a 1300° C. sinter temperature based upon all of the data from FIGS. 1 through 3 as explained above.

Figure 4:
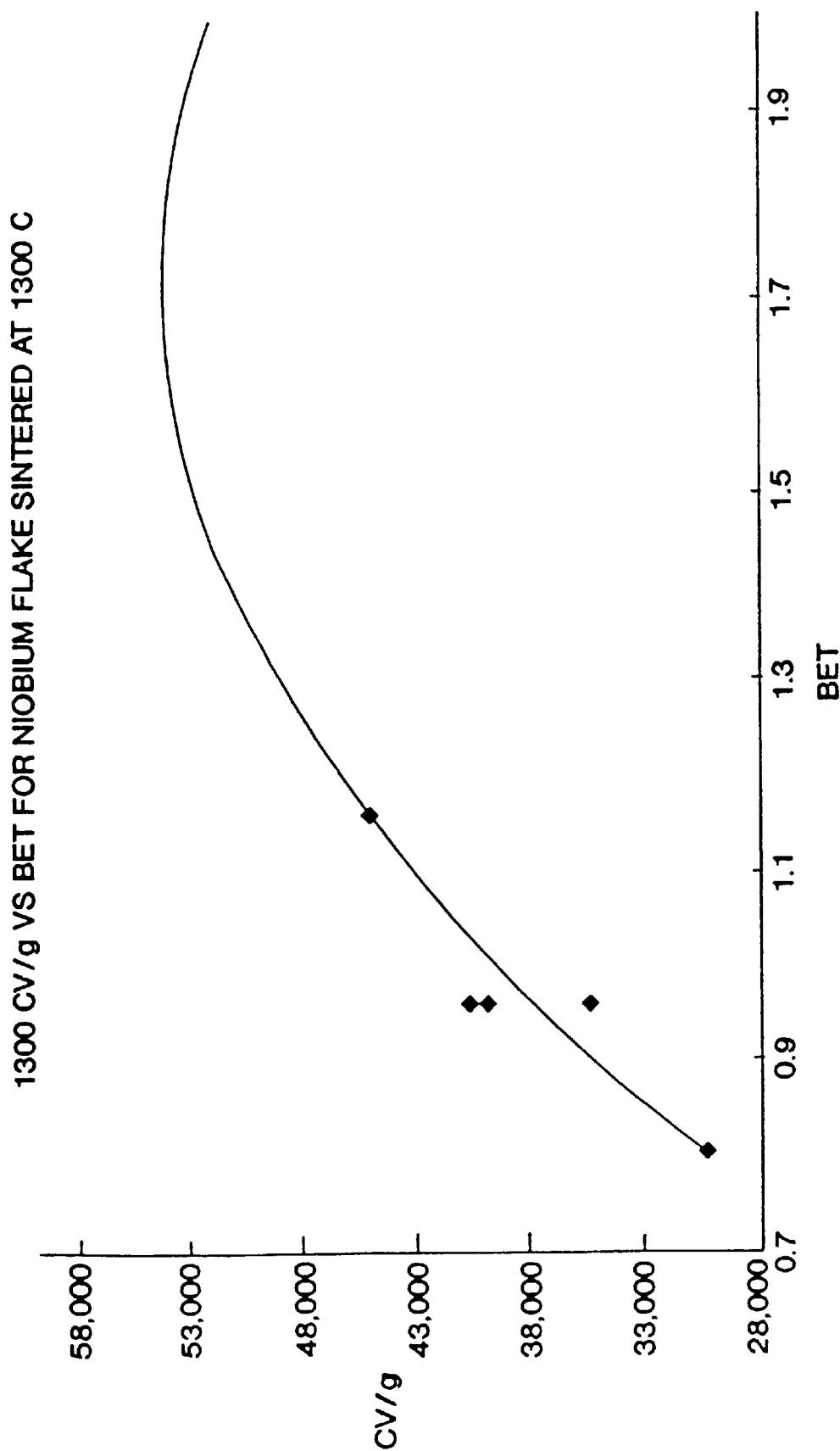
FIG. 4 is a graph depicting the BET surface areas of niobium powders and their respective capacitance when formed into anodes and sintered at a temperature of 1300° C.

FIG. 4 is the actual data for the available Nb samples tested at the 1300° C. sinter; however, it is seen in FIG. 4 that the data does not peak because none of the samples had the optimum BET for the 1300° C. sinter. The data was fitted to the quadratic function just as was used in FIGS. 1 through 3 and the result shown superimposed on FIG. 4 shows the peak should exist following the observations of peaks in FIGS. 1 through 3; and, the peak is shown to be a CV/g>55,000 and BET>1.7. It is readily apparent that in the case of FIG. 4, the peak CV/g predicted by using the same analysis used to make the data in FIG. 5 describes a maximum CV/g very close to the independently derived maximum estimated by FIG. 5. The agreement between two separate determinations of the maximum CV/g at the 1300° C. sinter agree and make it clear that the materials made with BET>1.7 (BETs on the order of 2 or more) will exhibit CV/g>55,000 (CV/g on the order of 60,000) when tested at 1300° C. sinter conditions.

TABLE 2

Example data used for Figures 1 through 4

| 1300 BET | 1300 CV/g | 1450 BET | 1450 CV/g | 1600 BET | 1600 CV/g | 1750 BET | 1750 CV/g |
|---|---|---|---|---|---|---|---|
| 0.8 | 30,302 | 0.8 | 22,757 | 0.8 | 14,433 | 0.8 | 7,972 |
| 0.8 | 30,423 | 0.8 | 22,982 | 0.8 | 14,754 | 0.8 | 8,517 |
| 1.16 | 45,440 | 1.16 | 29,916 | 1.16 | 16,495 | 1.16 | 7,785 |
| 0.96 | 40,797 | 0.96 | 29,868 | 0.96 | 18,480 | 0.96 | 9,958 |
| 0.96 | 35,350 | 0.96 | 27,959 | 0.96 | 17,742 | 0.96 | 9,611 |
| 0.96 | 40,235 | 0.96 | 30,147 | 0.96 | 18,707 | 0.96 | 9,989 |
| 0.96 | 35,481 | 0.96 | 27,667 | 0.96 | 17,977 | 0.96 | 9,611 |

EXAMPLE 10

The effects of oxygen on niobium powders were studied. Five samples of flaked niobium powder (prepared as in Example 5) each weighing 1 pound, were tested. One of the samples was a control and the four remaining samples were processed in such a manner as to increase the oxygen content in the niobium powder. In particular, the four samples were heat treated in a furnace at 900° C. for 30 minutes. The powders were then passivated in air in a manner similar to the air passivation discussed in the proceeding examples. Then, one of the four samples was removed and the three remaining samples heat treated and passivated again in the same manner described above. As before, one of these three samples was then remove and the procedure was repeated again with the two remaining samples. Afterward, again one of the samples was removed and the final remaining sample was again heat treated and passivated as before. Thus, there were five samples prepared wherein either 0, 1, 2, 3, or 4 cycles of heat treatment were preformed. Prior to testing for the oxygen content in each of these samples, the samples were passed individually through a 40 mesh screen.

Figure 6:
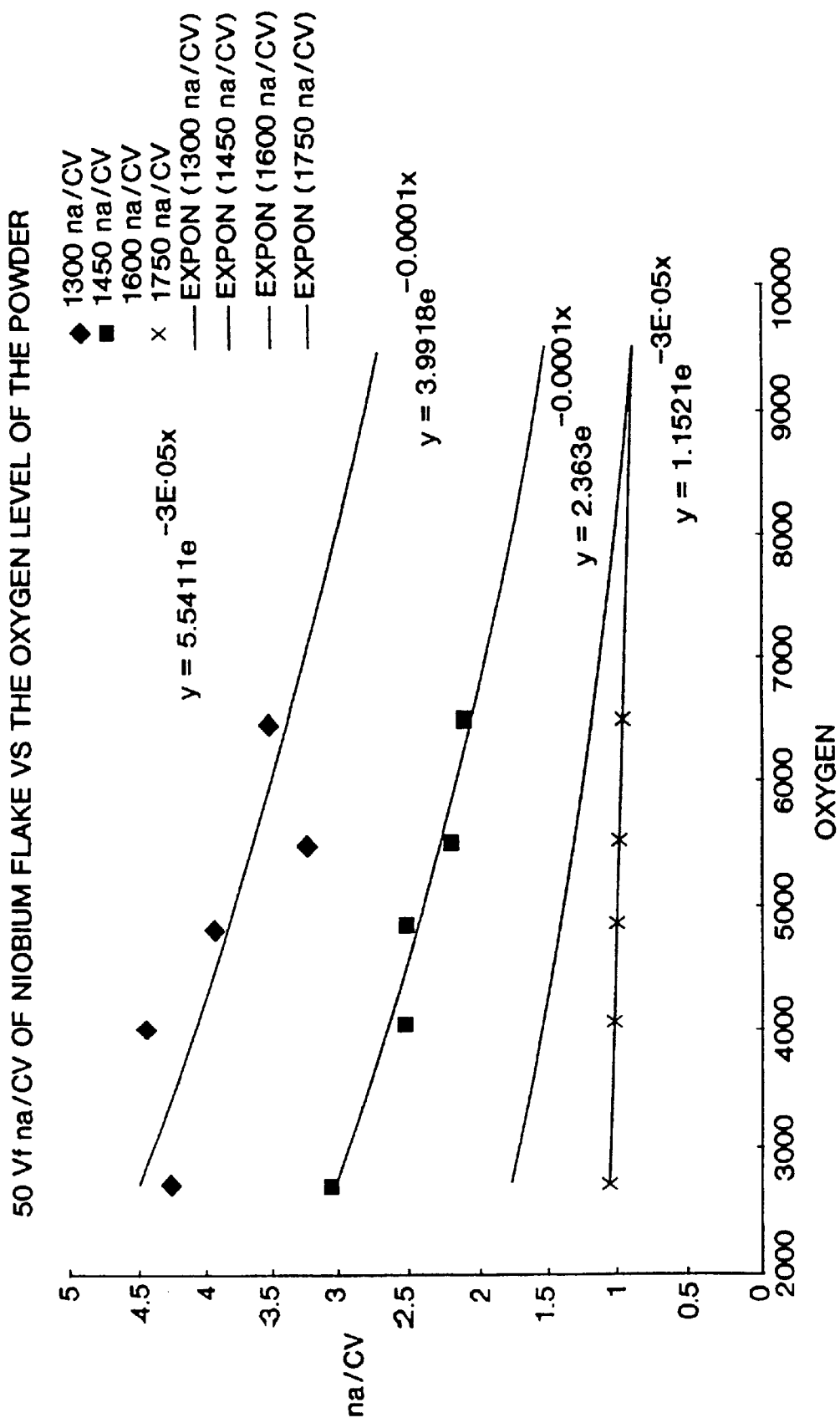
FIG. 6 is a graph depicting the oxygen doping content of niobium powders as well as their respective DC leakage when formed into anodes and sintered at different temperatures and using a forming voltage of 50 volts.
Figure 7:
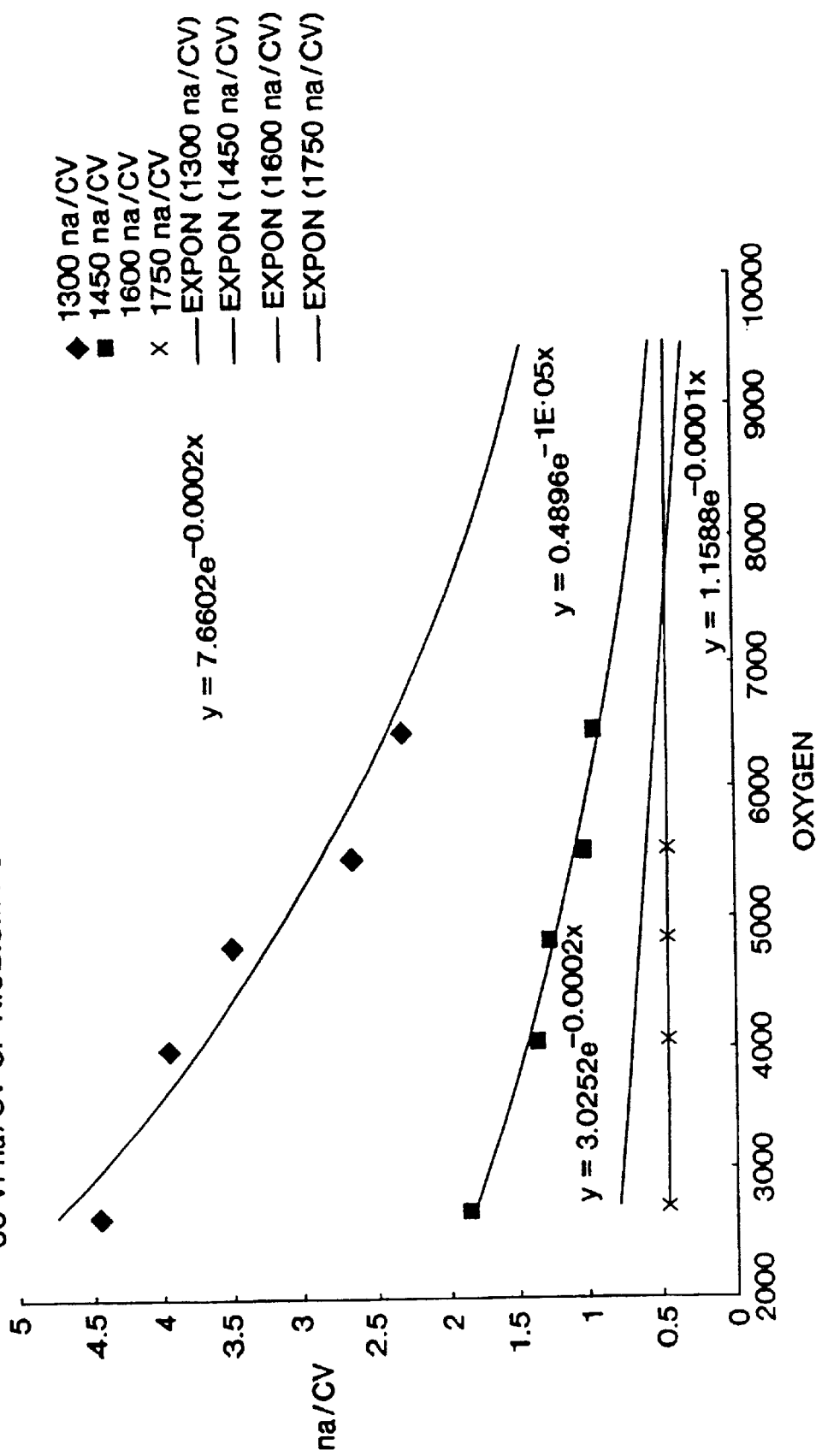
FIG. 7 is a graph showing niobium powders having various doping levels of oxygen as well as the respective DC leakage when formed into anodes and sintered at various temperatures and using a forming voltage of 30 volts.

The powders were then agglomerated and sintered at various temperatures and formed into anodes based on three different forming voltages as indicated in Table 3. The results of the DC leakage are also set forth in Table 3. As can be seen from the results in Table 3 and in FIGS. 6 and 7, the DC leakage gradually decreased as the oxygen content in the niobium increased. The decrease in DC leakage was especially apparent with lower forming voltages such as 30 and 50 volts.

TABLE 3

Data showing effect of $O_2$ on na/CV at 30, 50 and 60 Volts

| Oxygen | na/CV | na/CV | na/CV | na/CV |
|---|---|---|---|---|
|  | 1300 | 1450 | 1600 | 1750 |
| | | 30 Vf | | |
| 2725 | 4.47 | 1.86 | 0.89 | 0.47 |
| 4074 | 3.96 | 1.41 | 0.62 | 0.47 |
| 4870 | 3.49 | 1.29 | 0.58 | 0.45 |
| 5539 | 2.7 | 1.04 | 0.55 | 0.45 |
| 6499 | 2.38 | 0.95 | 0.54 | 0.45 |
| 8909 | 2.25 | 0.88 | 0.57 | 0.54 |
| | | | 1600 | 1750 |
| | | 50 Vf | | |
| 2725 | 4.31 | 3.07 | 1.84 | 1.08 |
| 4074 | 4.47 | 2.55 | 1.46 | 1.01 |
| 4870 | 3.96 | 2.51 | 1.42 | 0.99 |
| 5539 | 3.26 | 2.21 | 1.29 | 0.97 |
| 6499 | 3.5 | 2.09 | 1.23 | 0.97 |
| 8909 | 3.85 | 2.02 | 1.26 | 0.97 |
| | | | 1600 | 1750 |
| | | 60 Vf | | |
| 2725 | 22.16 | 25.06 | 28.64 | 27.08 |
| 4074 | 19.78 | 24.07 | 28.51 | 28.78 |
| 4870 | 19.11 | 24.71 | 28.51 | 27.67 |
| 5539 | 17.84 | 21.75 | 26.62 | 27.37 |
| 6499 | 17.88 | 22.37 | 24.88 | 25.69 |
| 8909 | 25.2 | 29.67 | 33.2 | 28.99 |

EXAMPLE 11

Figure 8:
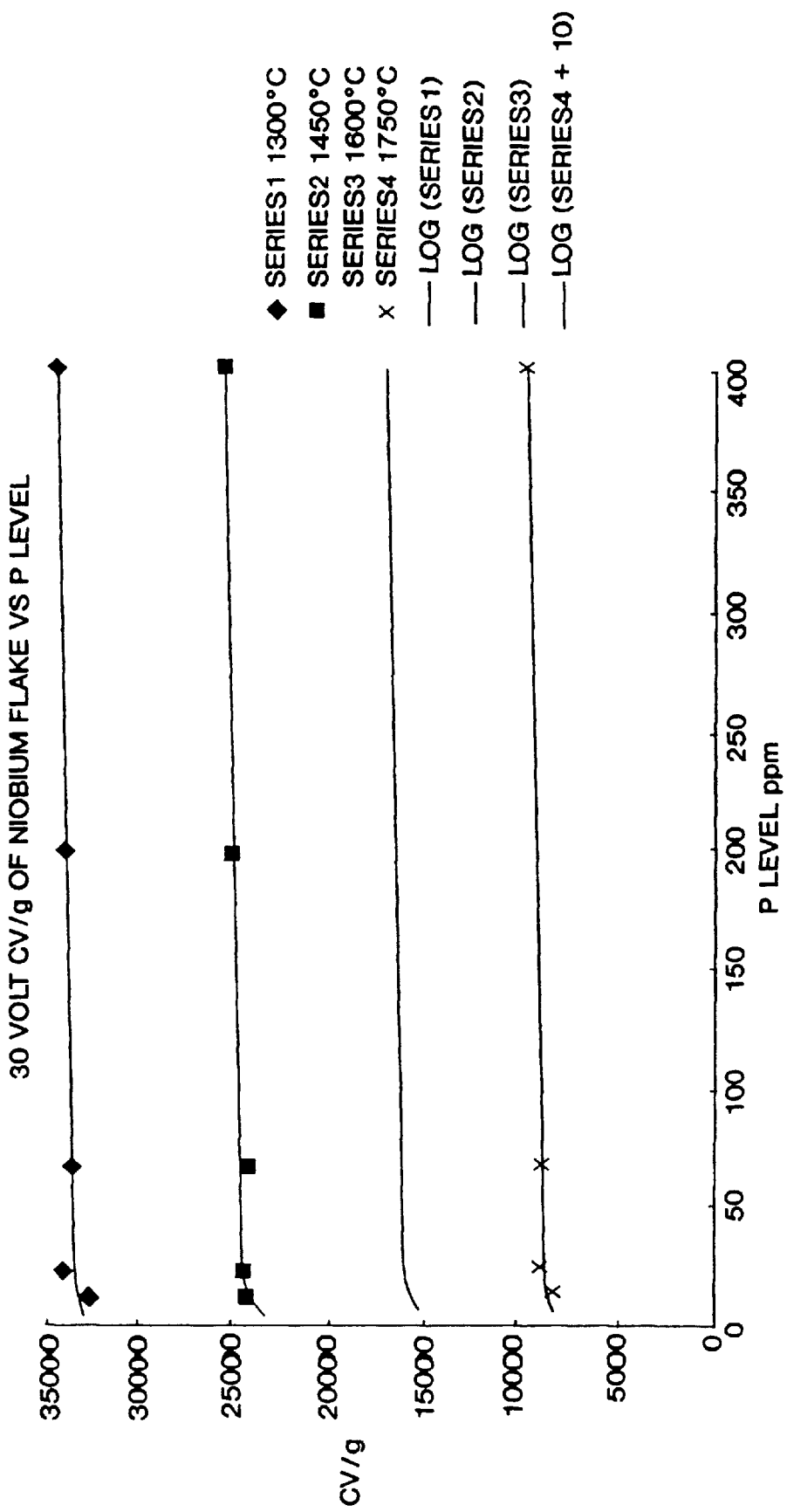
FIG. 8 is a graph showing the effects of various levels of phosphorus doping in niobium powders and their respective capacitance when formed into anodes.
Figure 9:
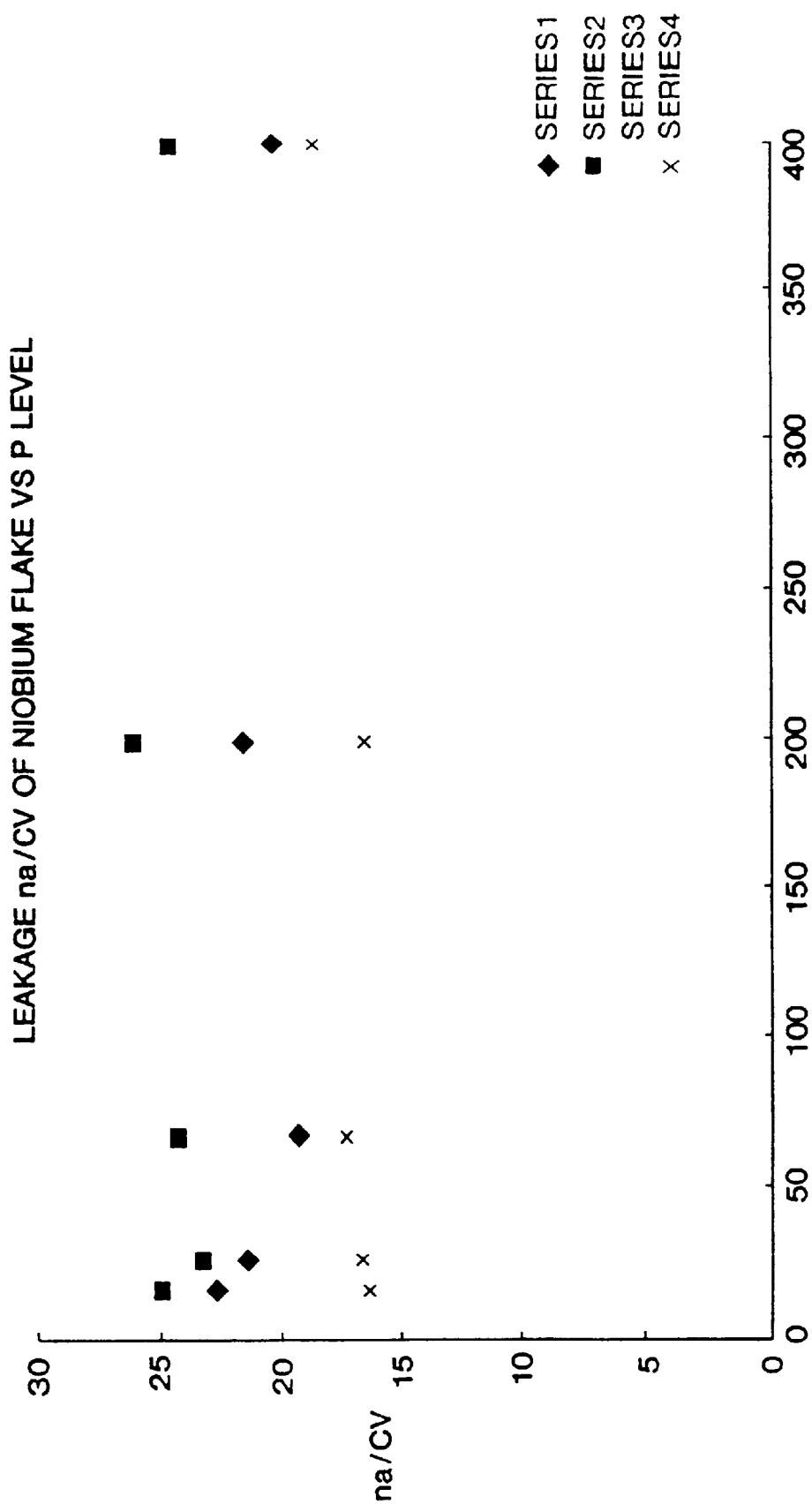
FIG. 9 is a graph showing the effects of various phosphorus doping levels of niobium powder and their respective DC leakage when formed into anodes.
Figure 10:
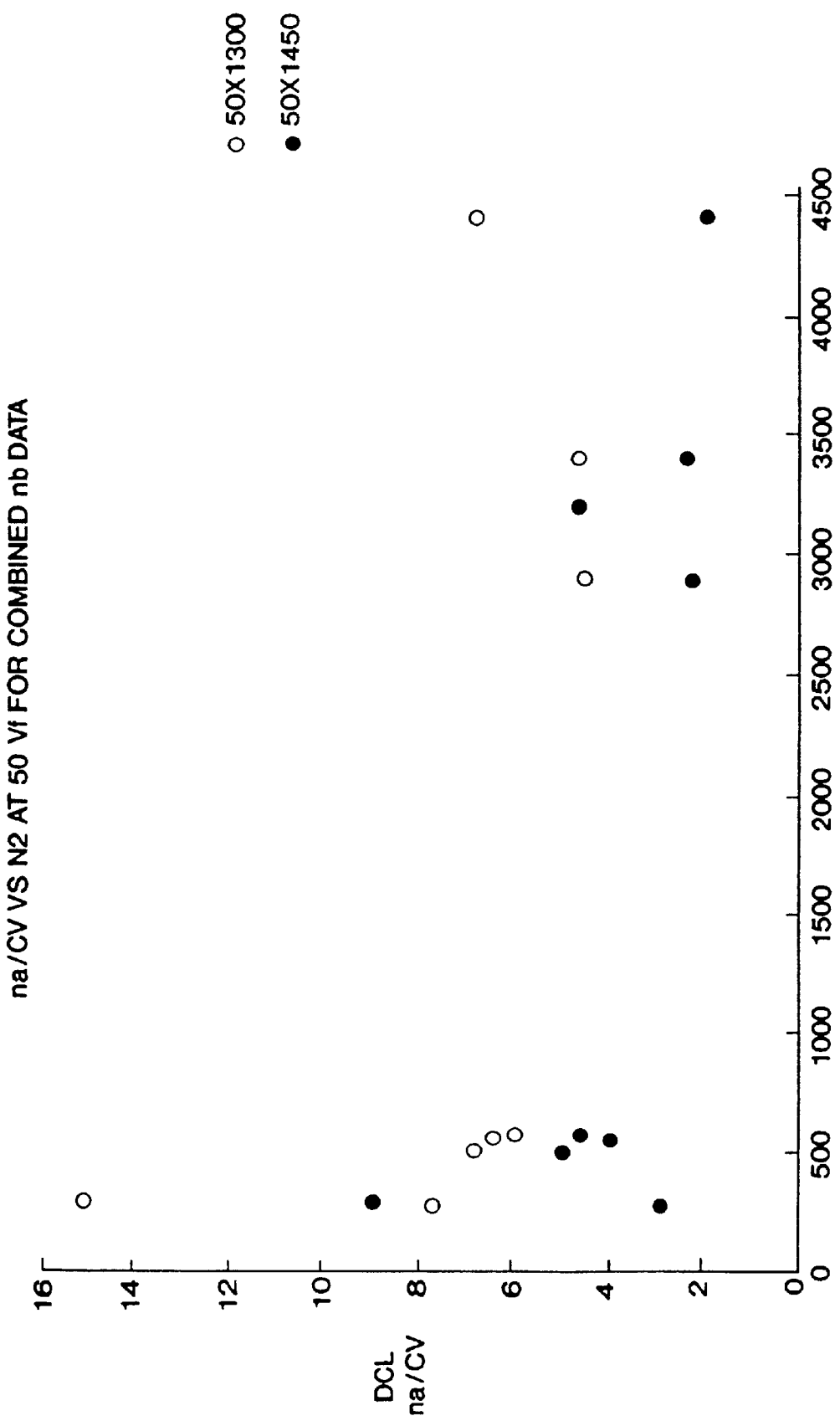
FIG. 10 is a graph showing the amount of nitrogen present in various niobium powders and their respective DC leakage when formed into anodes and sintered at 1300° C. or 1450° C., using a forming voltage of 50 volts.
Figure 11:
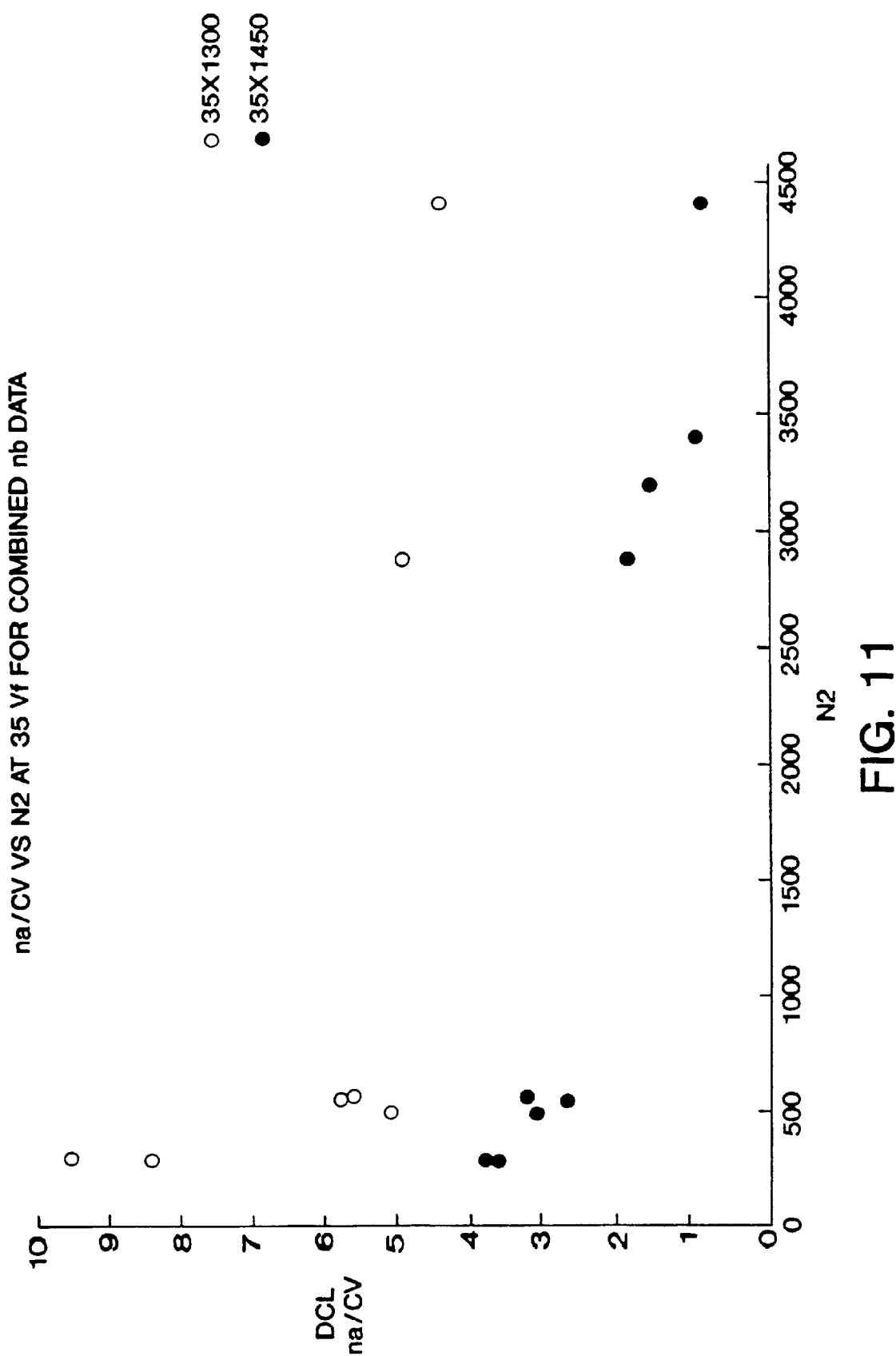
FIG. 11 is a graph showing the amount of nitrogen present in various niobium powders and their respective DC leakage when formed into anodes and sintered at 1300° C. or 1450° C., using a forming voltage of 35 volts.
Figure 12:
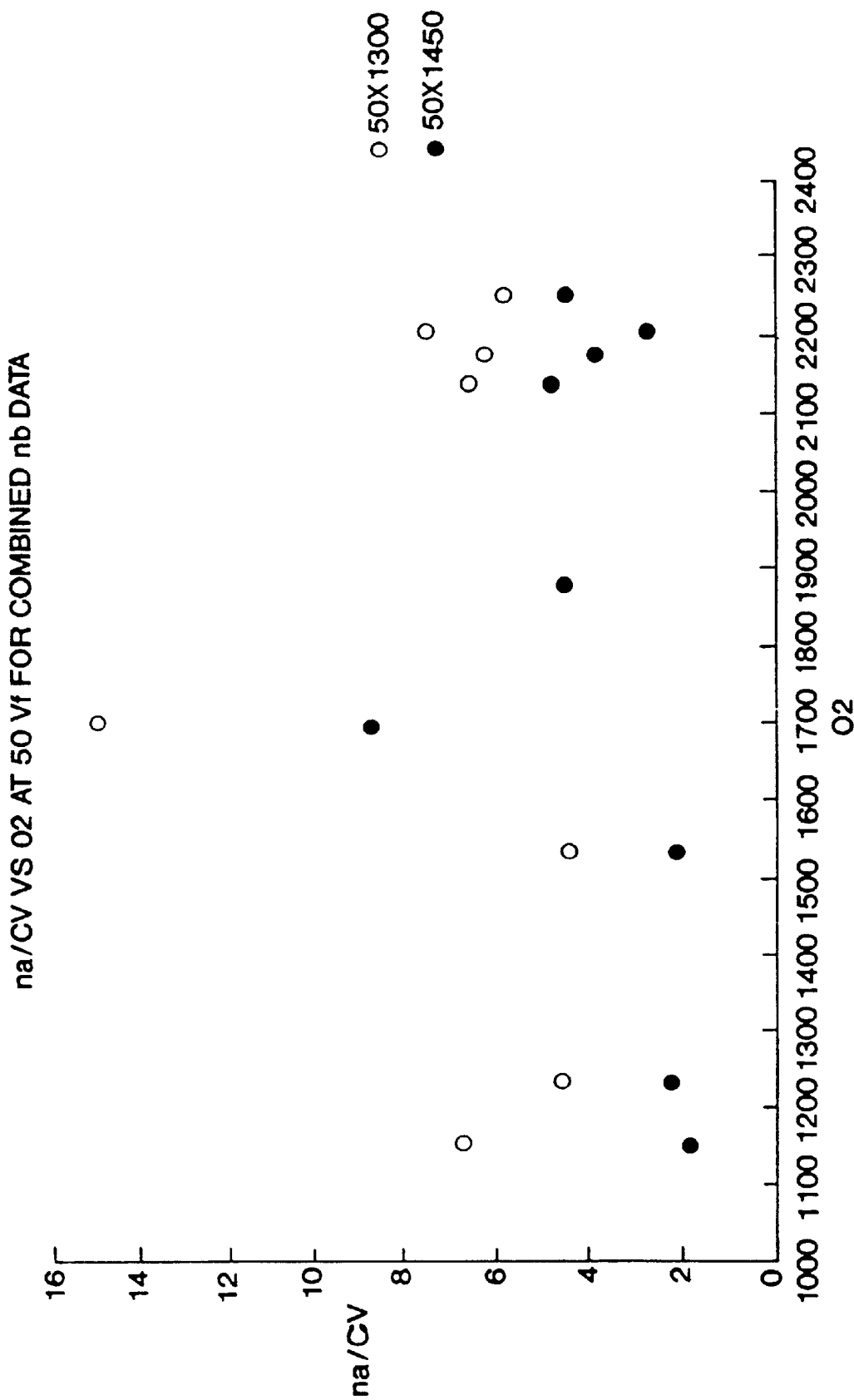
FIG. 12 is a graph showing the same niobium samples of FIG. 10 with regard to oxygen content and DC leakage.
Figure 13:
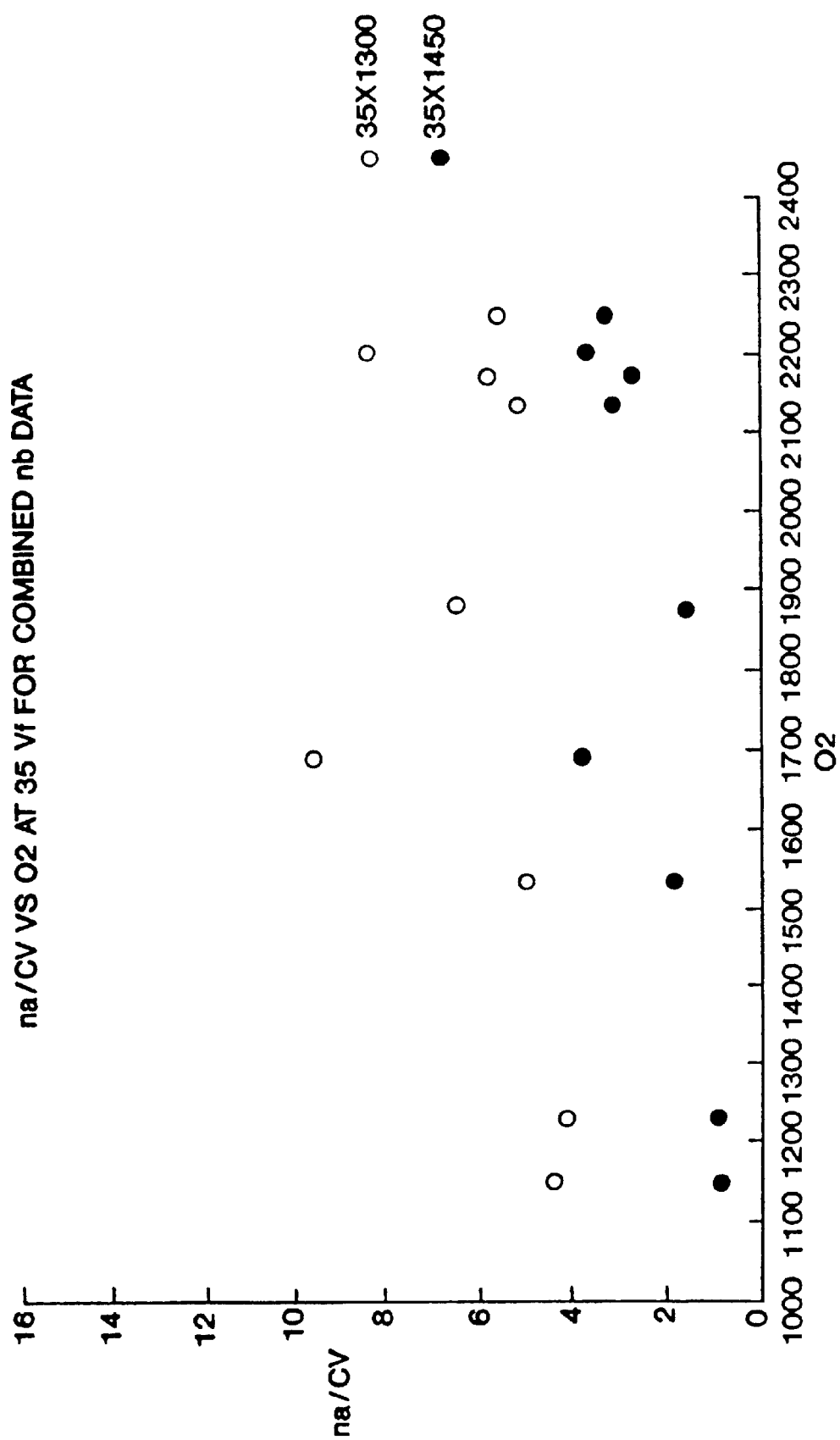
FIG. 13 is a graph showing the same niobium samples of FIG. 11 with regard to oxygen content and DC leakage.
Figure 14:
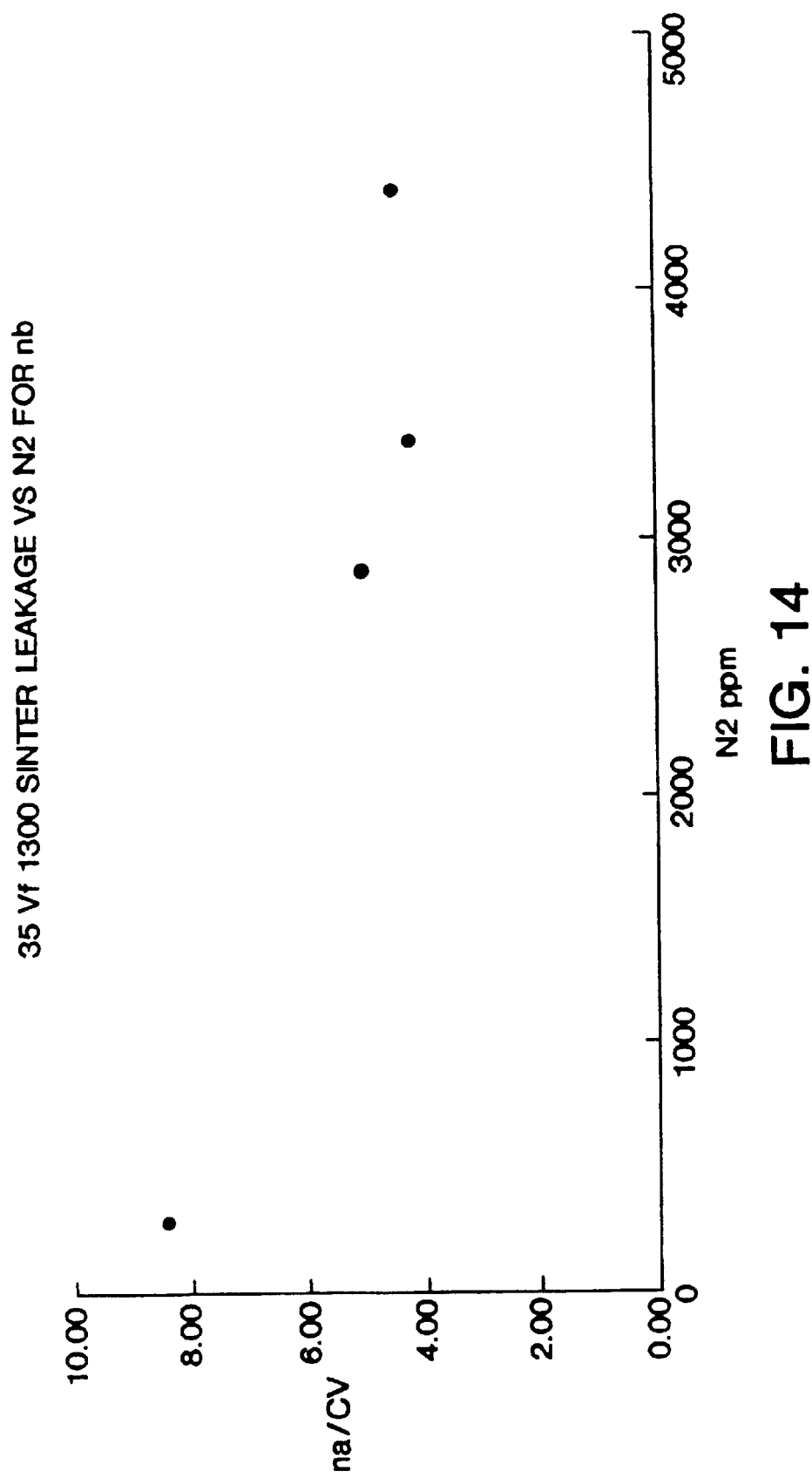
FIG. 14 is a graph showing the amount of nitrogen present in various niobium powders and their respective DC leakage when formed into anodes and sintered at 1300° C., using a forming voltage of 35 volts.
Figure 15:
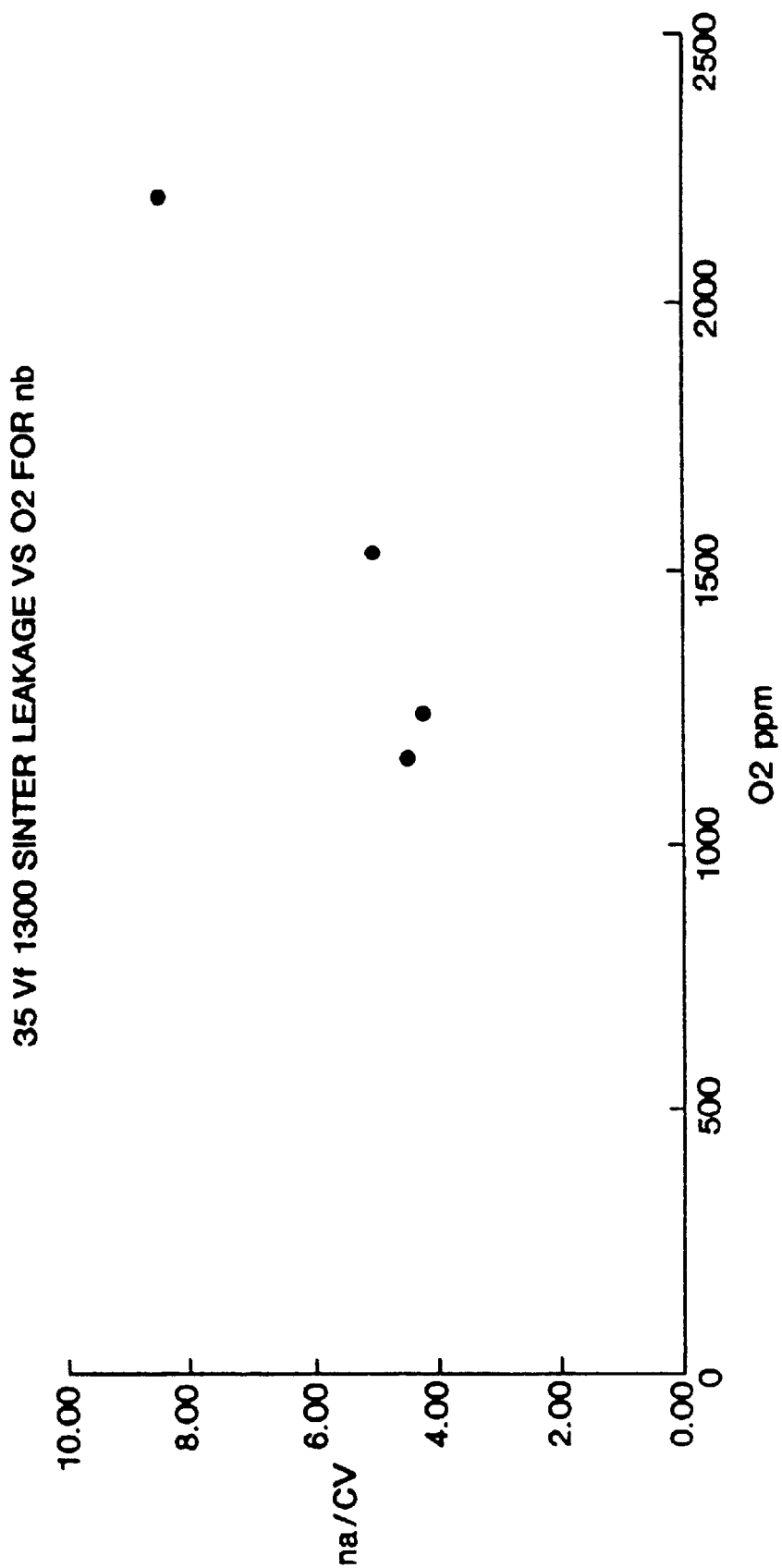
FIG. 15 is a graph showing the same niobium samples of FIG. 14 with regard to oxygen content and DC leakage.
Figure 16:
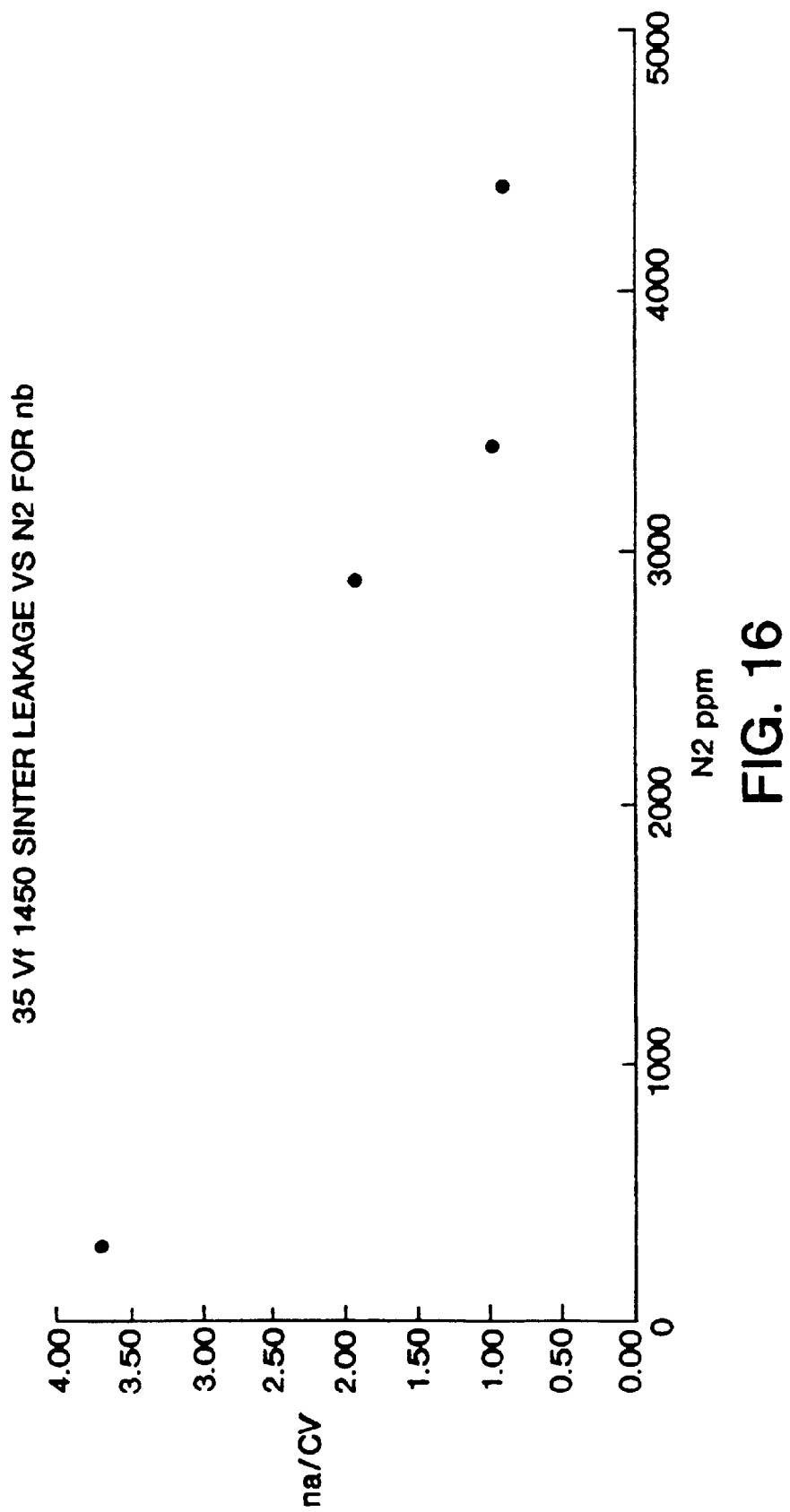
FIG. 16 is a graph showing the amount of nitrogen present in various niobium powders and their respective DC leakage when formed into anodes and sintered at 1450° C., using a forming voltage of 35 volts.
Figure 17:
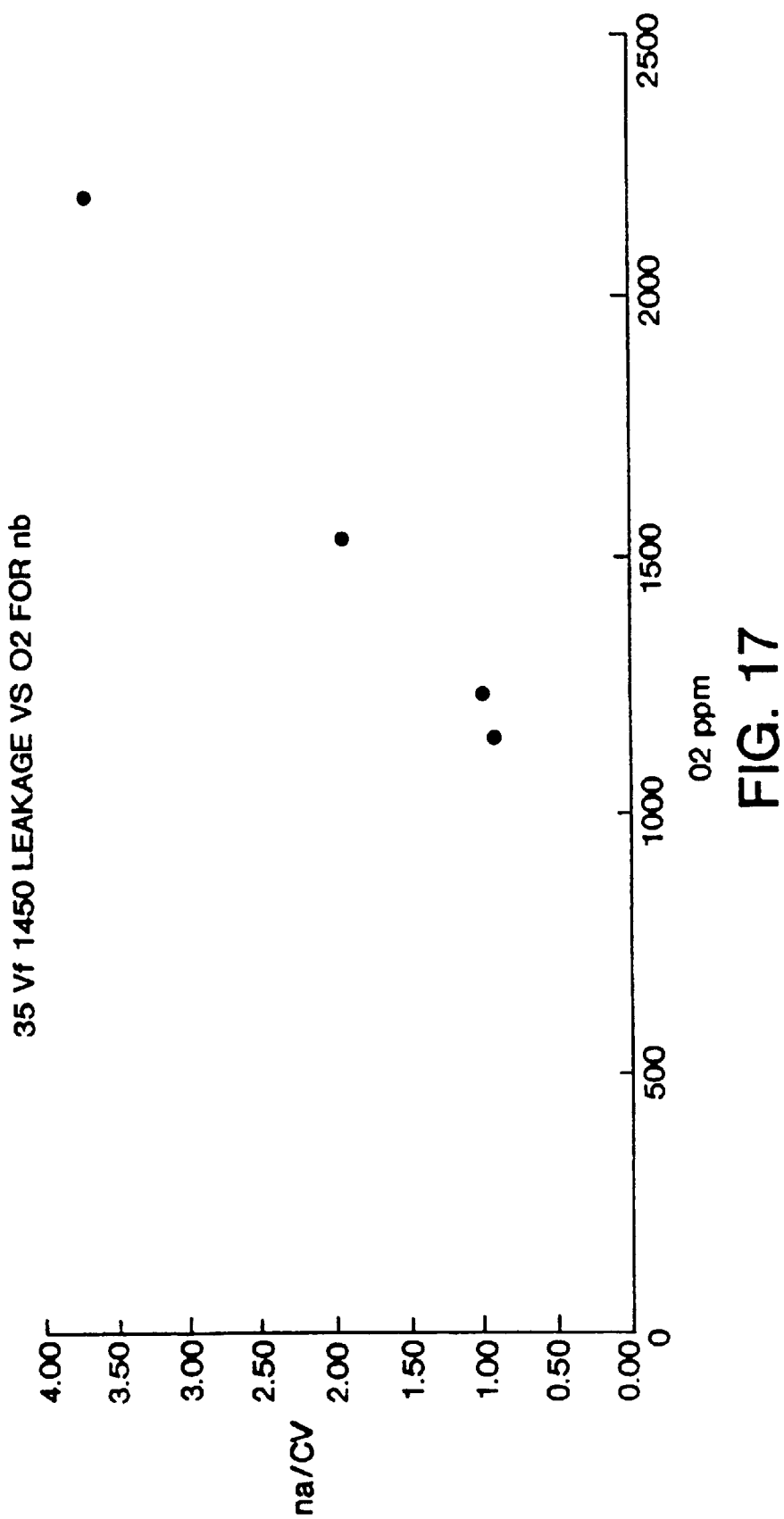
FIG. 17 is a graph showing the same niobium samples of FIG. 16 with regard to oxygen content and DC leakage.
Figure 18:
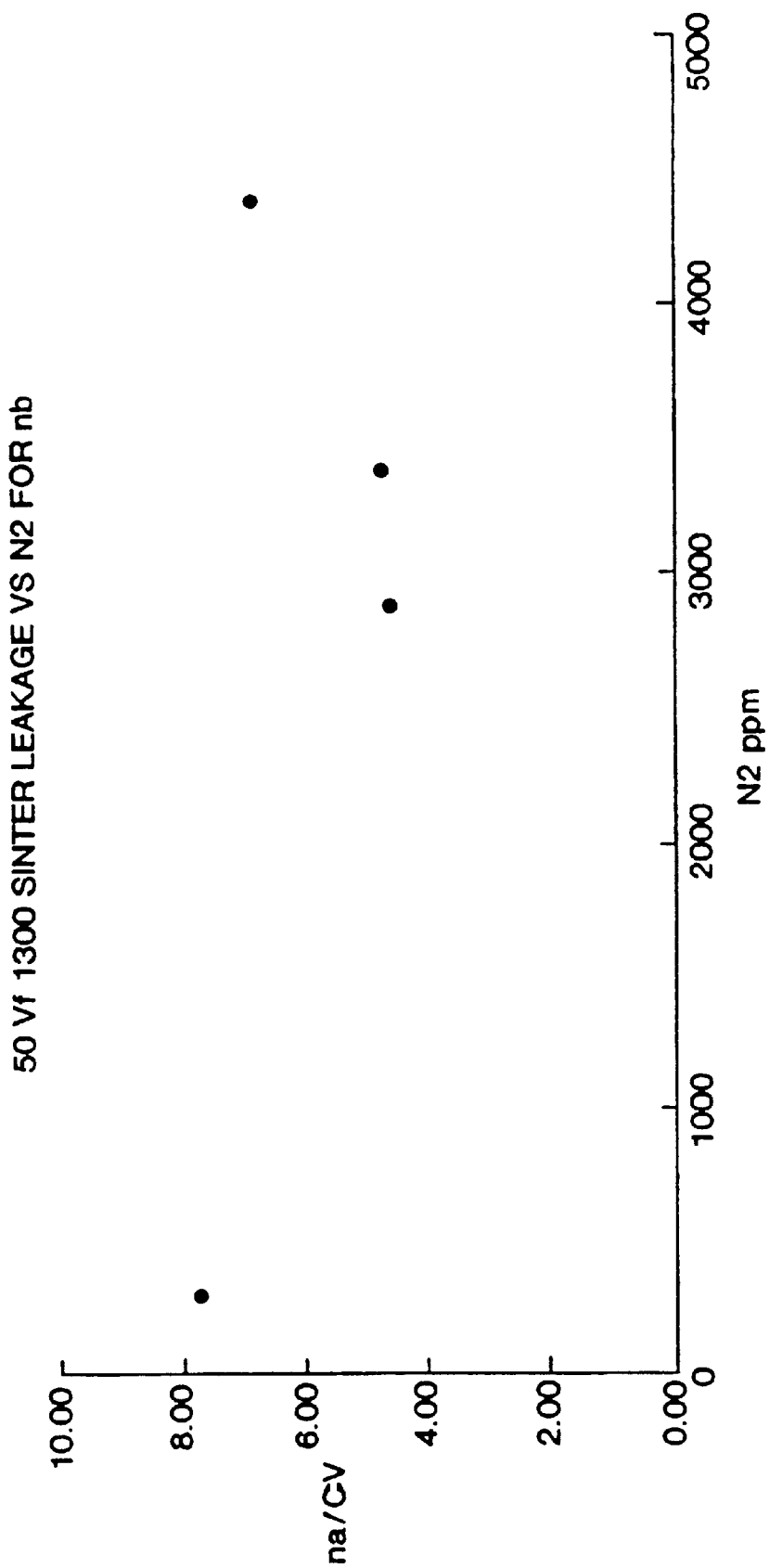
FIG. 18 is a graph showing the amount of nitrogen present in various niobium powders and their respective DC leakage when formed into anodes and sintered at 1300° C., using a forming voltage of 50 volts.
Figure 19:
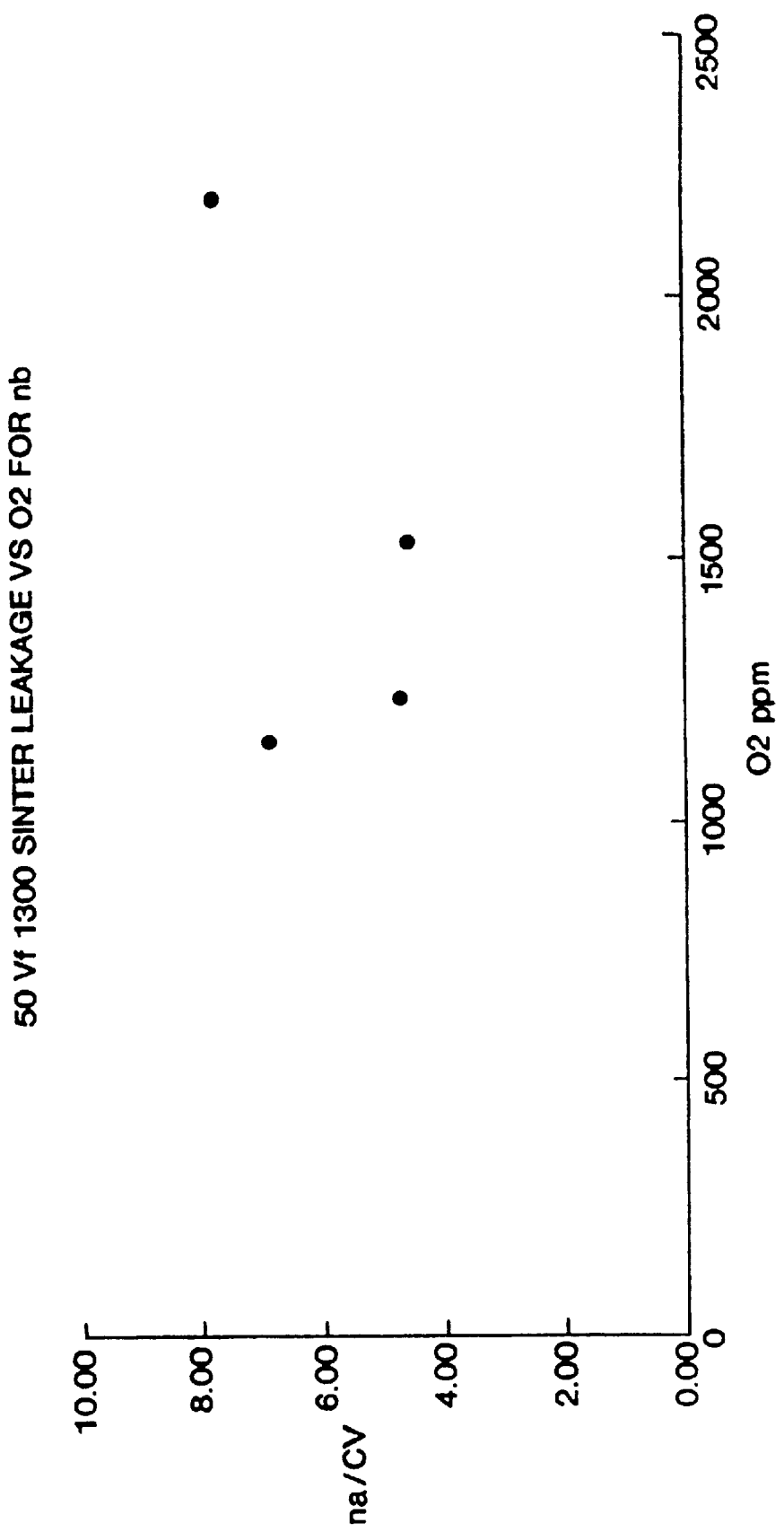
FIG. 19 is a graph showing the same niobium samples of FIG. 18 with regard to oxygen content and DC leakage.
Figure 20:
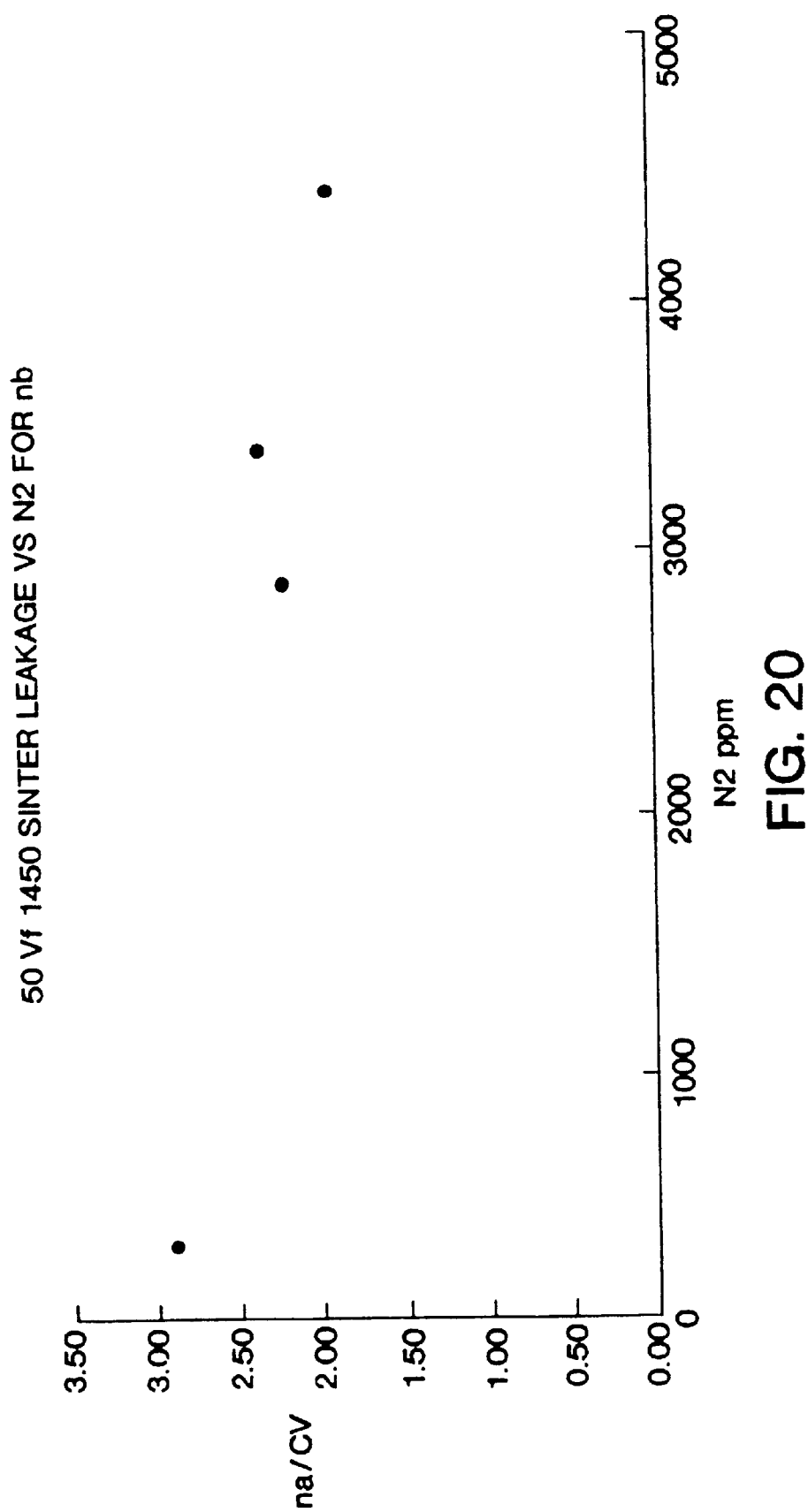
FIG. 20 is a graph showing the amount of nitrogen present in various niobium powders and their respective DC leakage when formed into anodes and sintered at 1450° C., using a forming voltage of 50 volts.
Figure 21:
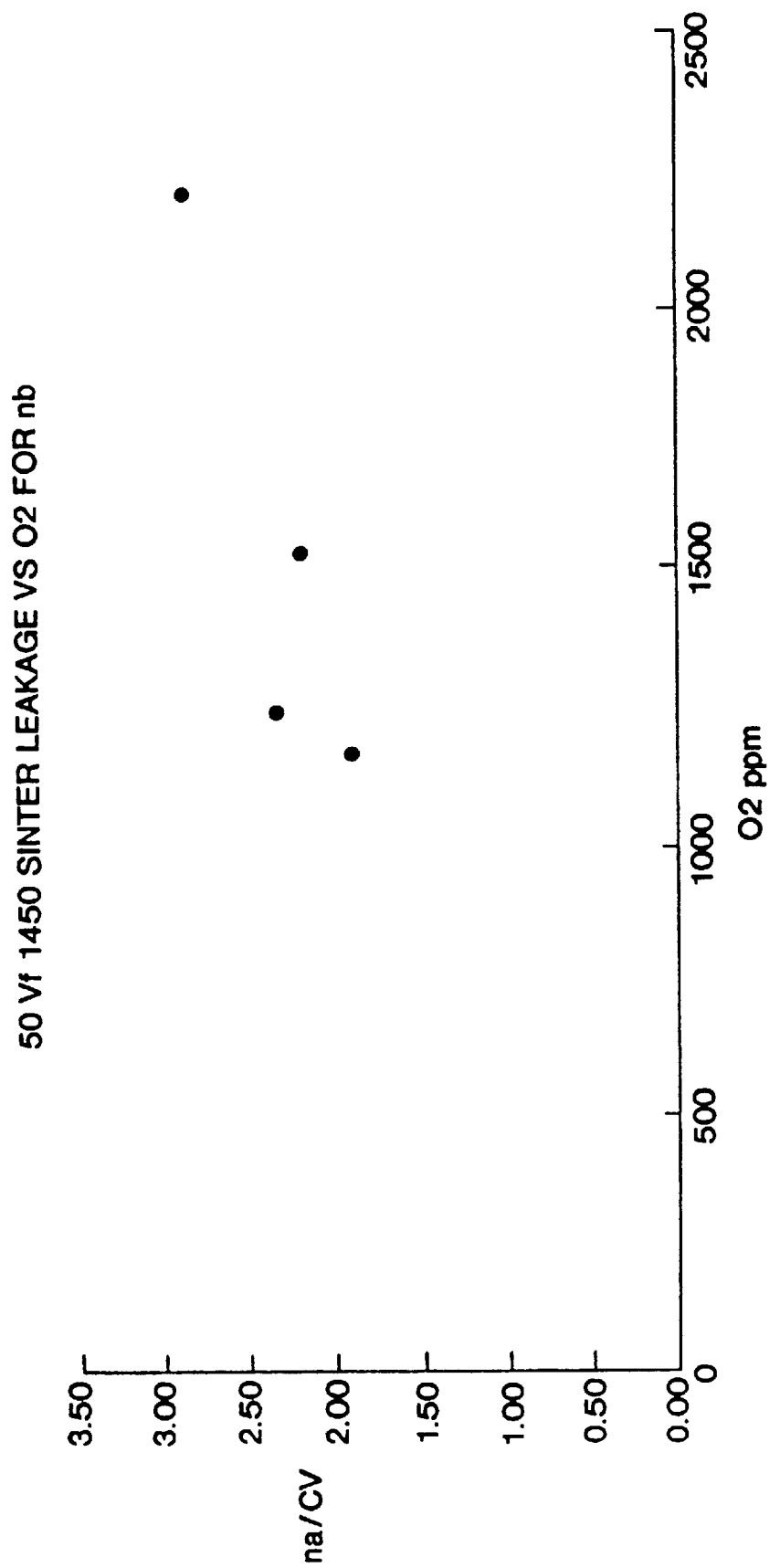
FIG. 21 is a graph showing the same niobium samples of FIG. 20 with regard to oxygen content and DC leakage.

The effect of phosphorus on niobium powder was then examined. Six samples of niobium powder prepared in a manner like Example 5 were tested. One of the samples was used as a control and the remaining five samples had sufficient phosphoric acid added to achieve phosphorus levels of 5 ppm, 10 ppm, 30 ppm, 100 ppm, and 500 ppm respectively. The phosphoric acid was added as a diluted solution with 150 ml of deionized water. The phosphoric acid solution and powder were mixed and the samples dried in a vacuum oven. After drying, the samples were individually blended and tested for phosphorus levels. The results are set forth in Table 4. As can be seen in Table 4 and FIGS. 8 and 9, there was a small effect caused by phosphorus doping and it was noticed that higher amounts of phosphorus doping did not necessarily improve the properties of DC leakage.

TABLE 4

P doped Niobium samples data

| doped P (ppm) | anode P (ppm) | CV/g (1300° C.) | Na/CV (1300° C.) |
|---|---|---|---|
| 16 | 13 | 33009 | 22.96 |
| 26 | 13 | 33614 | 21.77 |
| 69 | 100 | 33676 | 19.53 |

TABLE 4-continued

P doped Niobium samples data

| doped P (ppm) | anode P (ppm) | | |
|---|---|---|---|
| 200 | 58 | 33915 | 21.83 |
| 400 | 204 | 34213 | 20.65 |
| | | CV/g (1450° C.) | na/CV (1420° C.) |
| 16 | 0 | 24095 | 25.06 |
| 26 | 20 | 24375 | 23.4 |
| 62 | 72 | 24459 | 24.33 |
| 200 | 50 | 25348 | 26.09 |
| 400 | 339 | 25664 | 24.69 |
| | | CV/g (1600° C.) | na/CV (1600° C.) |
| 16 | 0 | 15757 | 25.51 |
| 26 | 0 | 15974 | 24.82 |
| 62 | 0 | 16131 | 24.57 |
| 200 | 56 | 16736 | 25.83 |
| 400 | 415 | 17011 | 27.18 |
| | | CV/g (1750° C.) | na/CV (1750° C.) |
| 16 | | 8575 | 16.39 |
| 26 | | 9176 | 16.69 |
| 62 | | 9315 | 17.35 |
| 200 | | 9551 | 16.54 |
| 400 | | 9670 | 18.74 |

EXAMPLE 12

The effects of nitrogen doping were studied.
Nitrogen Doping Example Pedigree:
Lots of Samples 60-, 25-, 55-, and 46-14XX Thrice melted electron beam produced niobium ingot was hydrided by heating the ingot in a vacuum of $10^{-4}$ torr to 850° C. for 120 minutes. The vacuum was replaced by hydrogen gas purge at 21 kPa for a sufficient time to embrittle the ingot. The vacuum was then pumped down to 28" Hg and backfilled with argon to −5" Hg. The pressure was maintained until the temperature, as measured by work thermocouple, stabilized. Air was gradually introduced in increasing pressure such that the work temperature did not rise.

Size reduction was accomplished by a Granutec crusher to reduce the maximum particle to that which would pass through a No. 20 sieve screen. Further reduction was accomplished by repeated processing in an impact mill by Vortec Products operated at 20,000 rpm until the material met a minimum of 95% passage through a No. 325 sieve screen (equivalent to 44 micron particle size).

Hydrogen was removed by heating the particles to 850° C. in a vacuum until pressure was no longer affected by hydrogen being emitted from the particles to provide niobium metal angular powder having a Scott Density of 42 and a BET of 0.22 $m^2/g$.

The powder was then milled in a 30 S Union Process Attritor Mill
  Media: 1,000 lbs. 3/16" SS media
  80 lbs. Niobium powder
  Duration: 4 hours, 30 minutes
  13 gallons of ethanol
  130 rpm The material was then vacuum filtered to remove residual ethanol and then washed with de-ionized water until no ethanol odor was noted and vacuum filtered to remove residual water. The wet powder was then washed in a slurry of hydrochloric acid (250 ml/lb.), hydrofluoric acid (6 ml/lb.) and de-ionized water (250 ml/lb.) to remove metallic contamination. The powder was then washed with deionized water and dried in air at 80° C.

The dried powder was hydrided a second time by exposure to hydrogen at 20.7 kPa and 850° C. to provide an embrittled flake which was cooled and reduced in size by an impact mill by Vortec Products to achieve a Scott density of 21.4.

The reduced size flaked powder was then agglomerated by heating in a vacuum at 1250° C. for 60 minutes to provide an agglomerated mass which was reduced in size to agglomerated particles of a maximum of a No. 50 sieve by a jaw crusher.

The powder was then deoxidized by blending with 4% w/w magnesium metal. The following thermal treatment was then executed in a retort furnace.

Reduce pressure to 100 microns.

Backfill with argon to 800 torr and 800° C. for 2 hours

Cool to room temperature

Passivate by increasing air content over 30 cycles of 2 minutes each wherein the system pressure progresses from high vacuum to atmospheric.

The material was then washed with a mixture of deionized ice (500 g/lb.), hydrofluoric acid (4 ml/lb.) and nitric acid (250 ml/lb.). The powder was then rinsed with deionized water and air dried at 80° C. (14B1)

Nitrogen doping procedure for samples 14XXX.

The niobium powder was then mixed with 4% magnesium powder and heated to 800° C. in argon and held at that temperature for 60 minutes. The vessel was evacuated and allowed to cool to 70° C. 130 Torr of N2 gas was held on the vessel and the temperature raised to 500° C. and held for 60 minutes under the argon atmosphere. The product was cooled to 40° C. and admitted to air gradually using standard passivation techniques.

Lots of Samples 60-, 25-, 55-, and 46-39XX

Thrice melted electron beam produced niobium ingot was hydrided by heating the ingot in a vacuum of $10^{-4}$ torr to 850° C. for 120 minutes. The vacuum was replaced by hydrogen gas purge at 21 kPa for a sufficient time to embrittle the ingot. The vacuum was then pumped down to −28" Hg and backfilled with argon to −5" Hg. The pressure was maintained until the temperature, as measured by work thermocouple, stabilized. Air was gradually introduced in increasing pressure such that the work temperature did not rise.

Size reduction was accomplished by a Granutec crusher to reduce the maximum particle to that which would pass through a No. 20 sieve screen. Further reduction was accomplished by repeated processing in an impact mill by Vortec Products operated at 20,000 rpm until the material met a minimum of 95% passage through a No. 325 sieve screen (equivalent to 44 micron particle size).

Hydrogen was removed by heating the particles to 850° C. in a vacuum until pressure was no longer affected by hydrogen being emitted from the particles to provide niobium metal angular powder having a Scott Density of 42 and a BET of 0.22 $m^2/g$. The product was then classified at +8 microns utilizing a Vortec Classifier.

The powder was then milled in a 30 S Union Process Attritor Mill

Media: 1,000 lbs. 3/16" SS media 80 lb. Niobium powder

Duration: 6 hours.

13 gallons ethanol 130 rpm

The material was then vacuum filtered to remove residual ethanol then washed with de-ionized water until no ethanol odor was noted and vacuum filtered to remove residual water. The wet powder was then washed in a slurry of hydrochloric acid (250 ml/lb.), hydrofluoric acid (6 ml/lb.) de-ionized water (250 ml/lb.) to remove metallic contamination. The powder was then washed with de-ionized water and dried in air at 80° C.

The dried powder was hydrided a second time by exposure to hydrogen at 20.7 kPa and 850° C. to provide an embrittled flake which was cooled and reduced in size by an impact mill by Vortec Products to achieve a Scott density of 21.4.

The reduced size flaked powder was then agglomerated by heating in a vacuum at 1200° C. for 60 minutes to provide an agglomerated mass which was reduced in size to agglomerated particles of a maximum of a No. 50 sieve by a jaw crusher. It was then thermally agglomerated a second time to 1225° C. for 60 minutes. After cooling the furnace down to a targeted level (see following table), nitrogen was pumped in at a rate of 5 SCFH for the specified time under vacuum. Material was then passivated by gradually increasing the operating pressure with air over a forty minute period until atmospheric pressure was restored.

| Temperature (° C.) | Soak Time (minutes) | Nitrogen (ppm) |
|---|---|---|
| 752 | 90 | 4,155 |
| 932 | 120 | 1,580 |
| 752 | 60 | 830 |
| 752 | 120 | 776 |

This material was then crushed a second time to reduce the maximum observed particle to one which would pass through a No. 50 sieve.

The powder was then deoxidized by blending with 4% w/w magnesium metal then doped with nitrogen. The following thermal treatment was then executed in a retort furnace.

Reduce pressure 100 microns.

Backfill with argon to 800 torr and 800° C. for 2 hours

Cool to 70° C. add 500 torr nitrogen

Heat to 500° hold for 60 minutes and cool to 40° C.

Passivate by increasing air content over 30 cycles of 2 minutes each wherein the system pressure progresses from high vacuum to atmospheric.

The material was then washed with a mixture of deionized ice (500 g/lb.), hydrofluoric acid (4 ml./lb.) and nitric acid (250 ml./lb.). The powder was then rinsed with deionized water and air dried at 80° C. Table 5 sets forth the analysis of the powder.

TABLE 5

| | Results | | | |
|---|---|---|---|---|
| | C (ppm) | O (ppm) | N (ppm) | H (ppm) |
| 14 | 251 | 2,202 | 273 | 30 |
| 14N2 | 289 | 1,231 | 3,399 | 41 |
| 14N3 | 292 | 1,149 | 4,409 | 40 |
| 39N1 | 204 | 1,530 | 2,877 | 48 |

The results of these experiments are set forth in Tables 6 and 7, which are also plotted in FIGS. 10–21. As can be seen, the nitrogen levels in the niobium contributed to lowering the DC leakage and at higher sintering temperatures of the anode, DC leakage was reduced even further, especially when using low forming voltages.

Capacitor anodes were prepared in a similar manner as the earlier examples.

sidered as exemplary only, with a true scope and spirit of the invention being indicated by the following claims.

What is claimed is:

1. Niobium powder having a nitrogen content of at least about 300 ppm and BET surface area of at least 0.62 m²/g.

TABLE 6

Niobium samples prepared to compare effects of nitrogen doping during deox on the DC leakage (na/CV) at 35 and 50 volts formations

| Forming Voltage | 35 v | | | | | | | |
|---|---|---|---|---|---|---|---|---|
| Sintering Temperature | 1300° C. | | | | 1450° C. | | | |
| sample ID | 25-14B1 | 55-39N1 | 46-14N2 | 55-14N3 | 25-14B1 | 55-39N1 | 46-14N2 | 55-14N3 |
| CV/g | 30,473 | 31,042 | 28,464 | 28,272 | 17,109 | 20,588 | 18,776 | 18,983 |
| na/CV | 8.44 | 5.03 | 4.20 | 4.46 | 3.70 | 1.94 | 0.99 | 0.92 |
| N2 | 273 | 2877 | 3399 | 4409 | 273 | 2877 | 3399 | 4409 |
| O2 | 2202 | 1530 | 1231 | 1149 | 2202 | 1530 | 1231 | 1149 |
| Forming Voltage | 50 v | | | | | | | |
| Sintering Temperature | 1300° C. | | | | 1450° C. | | | |
| sample ID | 25-14B1 | 55-39N1 | 46-14N2 | 55-14N3 | 25-14B1 | 55-39N1 | 46-14N2 | 55-14N3 |
| CV/g | 29,243 | 30,152 | 27,633 | 27,514 | 16,941 | 20,495 | 18,574 | 18,744 |
| na/CV | 7.74 | 4.57 | 4.70 | 6.86 | 2.90 | 2.22 | 2.36 | 1.93 |
| N2 | 273 | 2877 | 3399 | 4409 | 273 | 2877 | 3399 | 4409 |
| O2 | 2202 | 1530 | 231 | 1149 | 2202 | 1530 | 1231 | 1149 |

TABLE 7

Niobium DC Leakage, oxygen and CV/g versus nitrogen added during heat treatment

| Sample | CV/g | N2 (ppm) | O2 (ppm) | DCL (na/cv) | Vf (volts) | Temp (0° C.) |
|---|---|---|---|---|---|---|
| 60-39N1 | 33,111 | 3190 | 1877 | 6.49 | 35 | 1300 |
| 60-39N2 | 32,668 | 561 | 2248 | 5.68 | 35 | 1300 |
| 60-39N3 | 32,812 | 544 | 2172 | 5.87 | 35 | 1300 |
| 60-14B | 29,348 | 286 | 1691 | 9.56 | 35 | 1300 |
| 60-39A | 32,198 | 489 | 2134 | 5.17 | 35 | 1300 |
| 60-39N1 | 21,330 | 3190 | 1877 | 1.65 | 35 | 1450 |
| 60-39N2 | 19,879 | 561 | 2248 | 3.31 | 35 | 1450 |
| 60-39N3 | 19,591 | 544 | 2172 | 2.75 | 35 | 1450 |
| 60-14B | 17,138 | 286 | 1691 | 3.85 | 35 | 1450 |
| 60-39A | 19,492 | 489 | 2134 | 3.15 | 35 | 1450 |
| 60-39N1 | 32,224 | 3190 | 1877 | 7.60 | 50 | 1300 |
| 60-39N2 | 31,860 | 561 | 2248 | 6.05 | 50 | 1300 |
| 60-39N3 | 31,991 | 544 | 2172 | 6.49 | 50 | 1300 |
| 60-14B | 28,411 | 286 | 1691 | 15.12 | 50 | 1300 |
| 60-39A | 31,570 | 489 | 2134 | 6.84 | 50 | 1300 |
| 60-39N1 | 21,327 | 3190 | 1877 | 4.70 | 50 | 1450 |
| 60-39N2 | 19,853 | 561 | 2248 | 4.67 | 50 | 1450 |
| 60-39N3 | 19,598 | 544 | 2172 | 4.02 | 50 | 1450 |
| 60-14B | 17,023 | 286 | 1691 | 8.96 | 50 | 1450 |
| 60-39A | 19,428 | 489 | 2134 | 5.00 | 50 | 1450 |

Other embodiments of the present invention will be apparent to those skilled in the art from consideration of the specification and practice of the invention disclosed herein. It is intended that the specification and examples be con- 2. The niobium powder of claim 1, wherein said nitrogen content is at least about 400 ppm.

3. The niobium powder of claim 1, wherein said nitrogen content is at least about 500 ppm.

4. The niobium powder of claim 1, wherein said nitrogen content is from about 300 to about 5,000 ppm.

5. The niobium powder of claim 1, wherein said nitrogen content is from about 500 ppm to about 4,000 ppm.

6. The niobium powder of claim 1, wherein said nitrogen content is from about 500 ppm to about 3,500 ppm.

7. The niobium powder of claim 1, wherein said nitrogen content is from about 500 ppm to about 3,000 ppm.

8. The niobium powder of claim 1, wherein said nitrogen content is from about 1,500 ppm to about 5,000 ppm.

9. The niobium powder of claim 1, wherein when said powder is formed into an electrolytic capacitor anode, said anode has a DC leakage which is less than an electrolytic capacitor anode formed from niobium powder having substantially no nitrogen.

10. The niobium powder of claim 9, wherein the DC leakage is decreased about 50% or less compared to the electrolytic capacitor anode formed from niobium powder having substantially no nitrogen.

11. The niobium powder of claim 1, wherein the DC leakage is decreased about 25% or less compared to the electrolytic capacitor anode formed from niobium powder having substantially no nitrogen.

12. The niobium powder of claim 1, wherein the niobium powder comprises flaked niobium powder.

13. The niobium powder of claim 1, wherein said powder has a BET surface area of at least 0.8 m²/g.

14. The niobium powder of claim 1, wherein said powder has a BET surface area of from about 0.62 to about 5.0 $m^2/g$.

15. The niobium powder of claim 1, wherein said powder has a BET surface area of from about 0.8 to about 5.0 $m^2/g$.

16. The niobium powder of claim 12, wherein said powder has a Scott Density of less than about 35 $g/in^3$.

17. The niobium powder of claim 1, wherein when said powder is formed into an electrolytic capacitor anode, said anode has a capacitance of from about 30,000 CV/g to about 61,000 CV/g.

18. The niobium powder of claim 1, wherein said niobium powder comprises nodular, flaked, angular niobium powder, or combinations thereof.

19. A capacitor anode prepared from a formulation comprising the niobium powder of claim 1.

20. The capacitor of claim 19, wherein said powder is sintered at a temperature of from about 1200° C. to about 1750° C.

21. A capacitor comprising a capacitor anode, wherein said capacitor anode comprises the niobium powder of claim 1.

22. The niobium powder of claim 1, having a phosphorus level of less than about 400 ppm.

23. The capacitor of claim 19, wherein said capacitor is formed at a voltage of about 50 volts or less.

24. The capacitor of claim 19, wherein said capacitor has a DC leakage of less than about 5.0 na/CV.

25. The capacitor of claim 19, wherein said capacitor has a DC leakage of from about 5.0 na/CV to about 0.50 na/CV.

26. A capacitor anode comprising the niobium powder of claim 1.

27. A capacitor anode comprising niobium powder having a nitrogen content of at least about 300 ppm, wherein said anode has a working voltage of from about 4 to about 16 volts.

28. The capacitor anode of claim 27, wherein said nitrogen content is from about 300 to about 5,000 ppm.

29. The capacitor anode of claim 27, wherein said nitrogen content is from about 1,500 ppm to about 5,000 ppm.

30. The niobium powder of claim 1, further comprising an oxygen content of at least about 2,000 ppm oxygen.

31. The niobium powder of claim 1, wherein said niobium powder is doped with oxygen.

32. The capacitor anode of claim 27, wherein said niobium powder is doped with oxygen.

33. Nitrided niobium powder having a BET surface area of at least 0.62 $m^2/g$.

34. The nitrided niobium powder of claim 33 having a BET surface area of from 0.62 $m^2/g$ to 5.0 $m^2/g$.

35. The nitrided niobium powder of claim 33 having a BET surface area of 0.8 $m^2/g$ to 5.0 $m^2/g$.

36. The nitrided niobium powder of claim 33 having a BET surface area of at least 1.0 $m^2/g$.

37. The nitrided niobium powder of claim 33 having a BET surface area of from about 1.0 $m^2/g$ to about 5.0 $m^2/g$.

38. A capacitor anode comprising the nitrided niobium powder of claim 33.

39. A capacitor anode comprising the nitrided niobium powder of claim 34.

40. A capacitor anode comprising the nitrided niobium powder of claim 35.

41. A capacitor anode comprising the nitrided niobium powder of claim 36.

42. A capacitor anode comprising the nitrided niobium powder of claim 37.

* * * * *